US008462877B2

(12) United States Patent
Feng et al.

(10) Patent No.: US 8,462,877 B2
(45) Date of Patent: Jun. 11, 2013

(54) METHOD AND APPARATUS FOR TRANSMITTING/RECEIVING MBMS BASED ON HM

(75) Inventors: Minghai Feng, Beijing (CN); Xiaoming She, Beijing (CN); Lan Chen, Beijing (CN)

(73) Assignee: NTT DoCoMo, Inc., Tokyo (JP)

( * ) Notice: Subject to any disclaimer, the term of this patent is extended or adjusted under 35 U.S.C. 154(b) by 914 days.

(21) Appl. No.: 12/557,356

(22) Filed: Sep. 10, 2009

(65) Prior Publication Data

US 2010/0067606 A1    Mar. 18, 2010

(30) Foreign Application Priority Data

Sep. 11, 2008    (CN) .......................... 2008 1 0213567

(51) Int. Cl.
*H04L 27/00*    (2006.01)
*H03C 5/00*    (2006.01)

(52) U.S. Cl.
USPC .......................................... 375/295; 375/268

(58) Field of Classification Search
USPC ................. 375/268, 279, 285, 296, 320, 329, 375/341, 346; 714/748
See application file for complete search history.

(56) References Cited

U.S. PATENT DOCUMENTS

2003/0072286 A1*    4/2003    Kim et al. ..................... 370/335

FOREIGN PATENT DOCUMENTS

CN    1335722 A    2/2002
CN    1949698 A    4/2007

OTHER PUBLICATIONS

The First Office Action & Search Report from Chinese Patent Application No. CN200810213567.1, mailed Mar. 13, 2013, 5 pgs.

* cited by examiner

*Primary Examiner* — Daniel Washburn
*Assistant Examiner* — Brian J Stevens
(74) *Attorney, Agent, or Firm* — Blakely, Sokoloff, Taylor & Zafman LLP

(57) ABSTRACT

The present invention relates to a method and apparatus for transmitting/receiving multimedia broadcast/multicast data. The method includes the steps of: receiving a check report returned from a receiver, determining whether the check report indicates there are both basic layer and enhanced layer data errors and if yes, exchanging the last two bits of the enhanced layer and the first two bits of the basic layer and modulating the data with a second constellation map and then transmitting the data; otherwise determining whether the check report indicates there is only the basic layer error, and modulating and transmitting the data according to the result of determination. The beneficial effects of the present invention are that the retransmission efficiency can be improved and the ratio of receiving the data correctly by the users at the cell center and at the cell border during the first retransmission is improved.

24 Claims, 30 Drawing Sheets

--Prior Art--

--Prior Art--

METHOD AND APPARATUS FOR TRANSMITTING/RECEIVING MBMS BASED ON HM

PRIORITY

The present application claims priority to and incorporates by reference the entire contents of Chinese patent application, No. 200810213567.1, filed in China on Sep. 11, 2008.

FIELD OF THE INVENTION

The present invention relates to a communication field and particularly to a field of hierarchical modulation of multimedia broadcast/multicast, specifically a method and apparatus for transmitting/receiving multimedia broadcast/multicast data based on hierarchical modulation.

BACKGROUND OF THE INVENTION

The Multimedia Broadcast/Multicast Service (MBMS) was standardized in release 6 version of the WCDMA system and continuously evolves during the Long Term Evolution (LTE) and Long Term Evolution-Advanced (LTE-A) standardization process. The MBMS is a point to multiple points information transmission service for transmitting a same multimedia information to a group of users simultaneously and includes a multimedia broadcast service and a multimedia multicast service. During the standardization process of LTE, it is required that a frequency utilizing rate of 1 bit/s/Hz can be achieved at cell borders in a broadcast mode.

One main reason limiting the spectrum efficiency of the MBMS is a "bottleneck problem" in the signal transmission during broadcast or multicast. FIG. 1 is a schematic diagram showing a multicast according to prior arts. Users receiving the MBMS are distributed in different locations of a cell and the Signal to Interference plus Noise Ratio (SINR) of the users at the center of the cell is high and the SINR of the users at the border of the cell is low. In order to guarantee that users at the cell border can correctly receive the signal, the signal of the MBMS can only be modulated with a comparatively low order modulation mode, such as QPSK (Quadrature Phase Shift Key). This feature makes the users with comparatively good channel quality at the center of the cell being not able to use a high order modulation mode, and thus limits the frequency utilizing rate of the whole system.

The hierarchical modulation technology is a comparatively good method to solve the bottleneck problem in the MBMS transmission. In the current communication systems, the hierarchical modulation can be used to transmit two or more independent data blocks on a same carrier resource and the user may select to receive a corresponding data block according to the channel quality. Since channel qualities are different, when data are wrongly received, data blocks to be retransmitted to different users are different. The conventional retransmission methods do not take into account the feature of retransmitting the broadcast or multicast data with the hierarchical modulation technology and the transmission efficiency is low.

The hierarchical modulation adopts a non-even modulation constellation map. FIG. 2 shows a constellation map according to the prior art. Under the QPSK+16QAM mode, the data to be transmitted is divided into two groups: a basic layer (BL) and an enhanced layer (EL) and data at different layers have different transmission qualities, wherein the data at BL equal to be QPSK modulated and the data at EL equal to be 16QAM modulated. Thus, users with comparatively bad channel qualities at the cell border may only demodulate the data at the BL and users with comparatively good channel qualities at the cell center may demodulate the data at the BL and the EL simultaneously. FIG. 3 is a schematic diagram showing a hierarchical modulation according to the prior art. The bottleneck problem in transmission may be appropriately solved by applying the hierarchical modulation technology to the MBMS. In FIG. 3, BS represents a base station and the hierarchies are 64QAM, 16QAM and QPSK. In addition, it is found that the hierarchical modulation technology has been broadly adopted in the existing broadcast systems, such as DVB-T (Digital Video Broadcasting—Terrestrial), DVB-H (Digital Video Broadcasting—Handheld), UMB BCMCS (Ultra Mobile Broadband Broadcast/Multicast Services), and the like.

The retransmission technology is a critical technology guaranteeing the reliability of the information transmission and plays an important role in the MBMS transmission. The conventional retransmission methods of MBMS include retransmission with a fixed constellation map, retransmission by exchanging the BL and the EL, retransmission by reconfiguring a constellation map and retransmission by combining the constellation reconfiguration and exchange of the BL and the EL.

1. Retransmission with a Fixed Constellation Map

FIG. 4 is a schematic diagram showing the method for retransmitting with a fixed constellation map according to the prior art. The constellation map used at the retransmission (RETX) is the same as that used at the first transmission (1stTX). In FIG. 4, UE represents mobile terminal, vertical line part represents the BL, dot part represents the EL, blank part represents there is no data, "√" represents the data is received correctly, "x" represents the data is wrongly received and the same representation will be used hereinafter. According to this method, since users at the center of the cell have good channel qualities and are more likely to receive the data at the BL correctly, the retransmission of the data at the BL has little meaning for users with good channel qualities. Therefore, according to this method, users at the cell center have low spectrum utilizing rate.

2. Retransmission by Exchanging the BL and the EL

FIG. 5 is a schematic diagram showing the method for retransmitting by exchanging the BL and the EL. When retransmitting, data at the BL and the EL are exchanged. For the users at the cell center, since the EL data requires higher channel quality over the BL data, this method brings obvious advantages. However, since the users at the cell border may only expect to receive the BL data, this method will cause a decrease in performance for the users at the cell border.

3. Retransmission by Reconfiguring the Constellation

Taking the method for retransmitting by reconfiguring the 16QAM modulation constellation as an example, different (four) constellation maps are used during retransmission in order to achieve the object of constellations diversity. As compared with method 2, this method can only improve the performance of the users at the cell border and does not contribute much to that of the users at the cell center.

4. Retransmission Combining the Constellation Reconfiguration and Exchange of the BL and the EL In order to improve the performance of users at the cell border and at the cell center simultaneously, this method adopts a retransmission mode combining method 3 and 2 and alternatively adopts method 2 and 3 at different retransmission time. The problem of this method is that multiple retransmissions are needed for improving the channel qualities of the users at the cell border and at the cell center and thus the retransmission efficiency is comparatively low.

In summary, when a hierarchical modulation or a non-even constellation map is adopted, the users at the cell center and the cell border receive packets with different quality guarantees and the correctness in receiving packets by the users at the cell center and the cell border are different. In this case, how to arrange the retransmission signals in order to coordinate the retransmission of the BL data and the EL data and at the same time to improve the performance of the users at the cell center and the cell border has become the urgent need to be solved.

The above methods are incorporated by reference.

SUMMARY OF THE INVENTION

A method and apparatus for transmitting/receiving MBMS based on HM are described. In one embodiment, the method comprises determining whether the data is transmitted for a first time and if yes, modulating the data with a first constellation map in an order from a basic layer to an enhanced layer and then transmitting the data; and receiving a check report returned from a receiver, determining whether the check report indicates there are both basic layer and enhanced layer data errors and if yes, exchanging last two bits of the enhanced layer and first two bits of the basic layer and modulating the data with a second constellation map and then transmitting the data, and if no, determining whether the check report indicates there is only the basic layer error and if yes, modulating the data with the second constellation map in the order from the basic layer to the enhanced layer and then transmitting the data, otherwise exchanging the last two bits of the enhanced layer and the first two bits of the basic layer and modulating the data with the first constellation map and then transmitting the data.

BRIEF DESCRIPTION OF THE DRAWINGS

The accompanying drawings here provide further understanding of the present invention, constitute a part of the application and are not intended to limit the present invention, wherein.

DETAILED DESCRIPTION OF EMBODIMENTS

Figure 1:
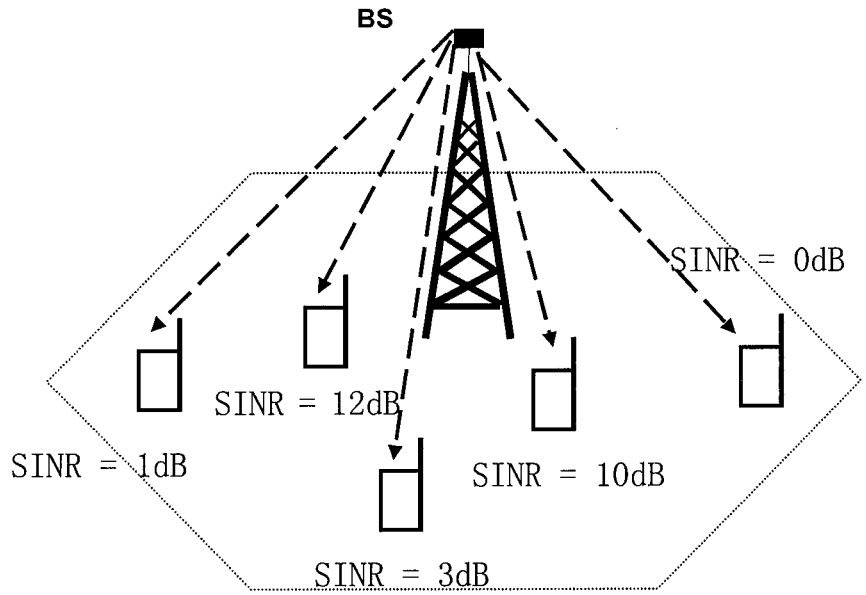
FIG. 1 is a schematic diagram showing a multicast according to the prior art.
Figure 2:
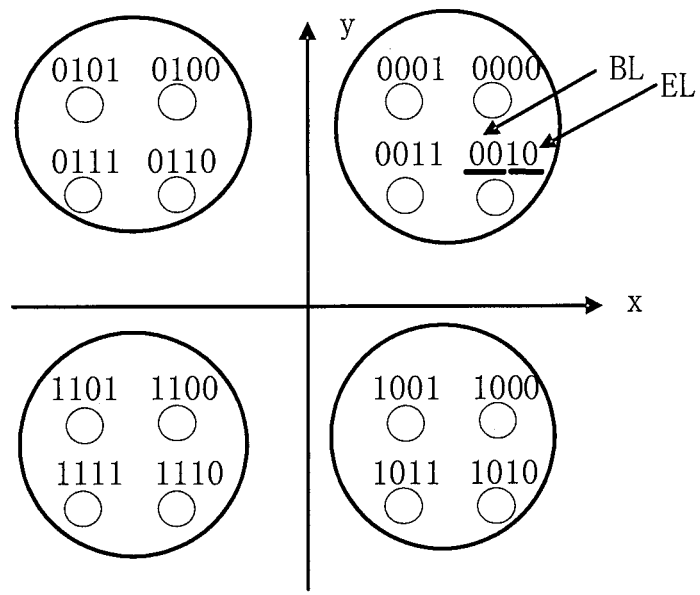
FIG. 2 is a diagram showing a constellation map according to the prior art.
Figure 3:
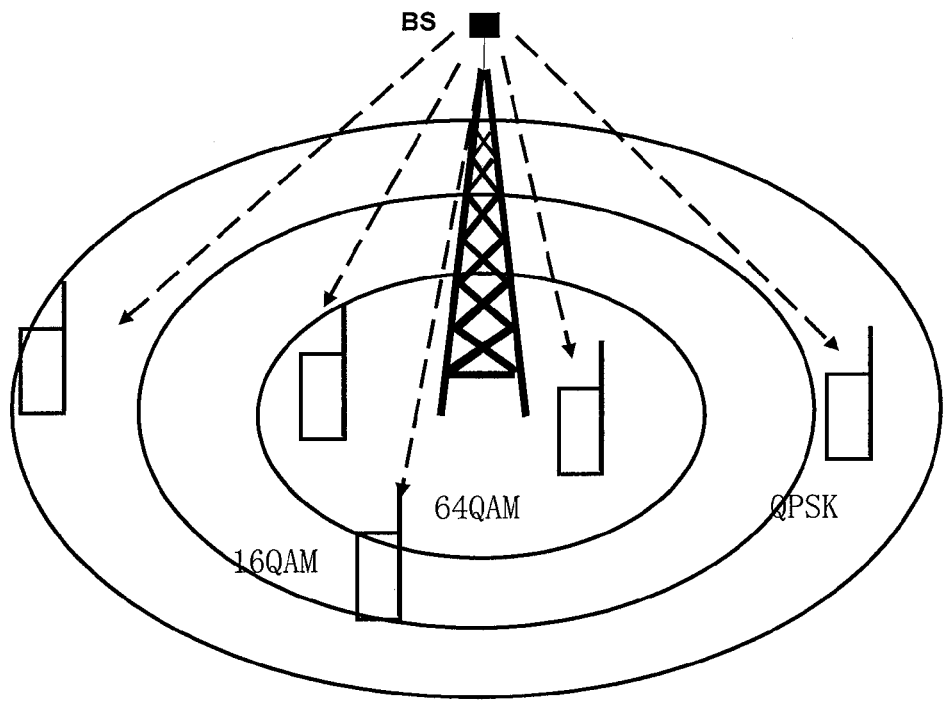
FIG. 3 is a schematic diagram showing a hierarchical modulation according to the prior art.
Figure 4:
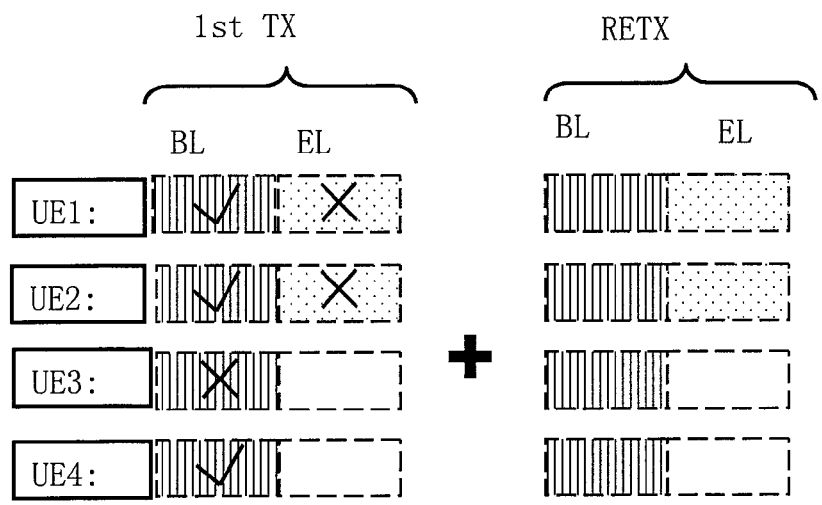
FIG. 4 is a schematic diagram showing the method for retransmitting with a fixed constellation map according to the prior art.
Figure 5:
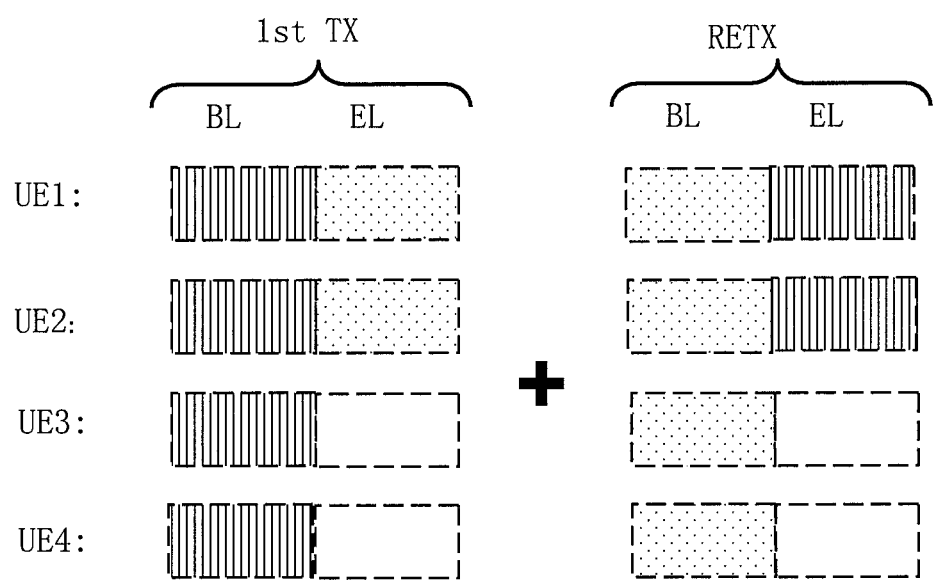
FIG. 5 is a schematic diagram showing the method for retransmitting by exchanging a BL and an EL according to the prior art.

One embodiment of the present invention comprises a method of transmitting multimedia broadcast/multicast data based on hierarchical modulation, in which signals are retransmitted by using different constellation maps in order to ensure that retransmitted data can bring gains to users with different channel qualities at the same time, to improve the retransmission efficiency and to optimize the system performance.

Another embodiment of the present invention comprises an apparatus for transmitting multimedia broadcast/multicast data based on hierarchical modulation, for implementing the corresponding method in order to improve the retransmission efficiency and to make receiving apparatuses at the cell center and at the cell border obtain good gains during the first retransmission.

Yet another embodiment of the present invention comprises a method of receiving multimedia broadcast/multicast data based on hierarchical modulation, for improving the receiving efficiencies of users at the cell center and at the cell border and for reducing retransmission times.

Still another embodiment of the present invention comprises an apparatus for receiving multimedia broadcast/multicast data based on hierarchical modulation, for implementing the corresponding method in order to improve the receiving efficiencies of users at the cell center and at the cell border and to optimize the system performance.

In order to achieve the above embodiments, an embodiment of the present invention provides a method of transmitting multimedia broadcast/multicast data based on hierarchical modulation, including the steps of: determining whether the data is transmitted for a first time and if yes, modulating the data with a first constellation map in an order from a basic layer to an enhanced layer and then transmitting the data; and receiving a check report returned from a receiver, determining whether the check report indicates there are both basic layer and enhanced layer data errors and if yes, exchanging last two bits of the enhanced layer and first two bits of the basic layer and modulating the data with a second constellation map and then transmitting the data, and if no, determining whether the check report indicates there is only the basic layer error and if yes, modulating the data with the second constellation map in the order from the basic layer to the enhanced layer and then transmitting the data, otherwise exchanging the last two bits of the enhanced layer and the first two bits of the basic layer and modulating the data with the first constellation map and then transmitting the data.

In order to achieve the above embodiment, an embodiment of the present invention provides an apparatus for transmitting multimedia broadcast/multicast data based on hierarchical modulation, including a communication unit, a transmitting unit, a determining unit, a retransmitting unit, an enhanced layer retransmitting unit and a basic layer retransmitting unit. Wherein the transmitting unit modulates data to be transmitted with a first constellation map in an order from a basic layer to an enhanced layer and transmits the data to the communication unit for further transmission. The communication unit receives a check report returned from a receiver and the determining unit determines according to the check report and if there are both enhanced layer and basic layer data errors, the retransmitting unit is called; if there is only the basic layer data error, the basic layer retransmitting unit is called; and if there is only the enhanced layer data error, the enhanced layer retransmitting unit is called. The retransmitting unit exchanges the last two bits of the enhanced layer and the first two bits of the basic layer, modulates the data with a second constellation map and then transmitting the data to the communication unit for further retransmission. The enhanced layer retransmitting unit exchanges the last two bits of the enhanced layer and the first two bits of the basic layer, modulates the data with the first constellation map and then transmits the data to the communication unit for further retransmission. The basic layer retransmitting unit modulates the data with the second constellation map in the order from the basic layer to the enhanced layer and then transmits the data to the communication unit for further retransmission.

In order to achieve the above embodiment, an embodiment of the present invention provides a method of receiving multimedia broadcast/multicast data based on hierarchical modulation, including the steps of: receiving data and determining whether the data is transmitted for a first time and if yes, demodulating the data with a first constellation map, checking the data in an order from a basic layer to an enhanced layer and then transmitting a check report; and receiving retransmitted data from a transmitter, determining whether the check report indicates there are both basic layer and enhanced layer data errors and if yes, demodulating the retransmitted data with a second constellation map, exchanging the last two bits of the enhanced layer and the first two bits of the basic layer of the retransmitted data and sequencing the retransmitted data, checking the sequenced retransmitted data and transmitting a check report; and if not, determining whether the check report indicates there is only the basic layer error and if yes, demodulating the retransmitted data with the second constellation map, checking in the order of the retransmitted data and then transmitting a check report, otherwise demodulating the retransmitted data with the first constellation map, exchanging the last two bits of the enhanced layer and the first two bits of the basic layer and sequencing the retransmitted data, checking the sequenced retransmitted data and transmitting a check report.

According to a further embodiment of the method of receiving multimedia broadcast/multicast data, before the step of determining whether the check report indicates there are both basic layer and enhanced layer data errors, the method further includes a retransmission times determining step for determining whether the retransmission times exceed a preset threshold and if yes, the procedure ends, otherwise the procedure proceeds to the step of determining whether the check report indicates there are both basic layer and enhanced layer data errors.

According to a further embodiment of the method of receiving multimedia broadcast/multicast data, before the retransmission times determining step, the method further includes a step of determining whether a receiver has received the data correctly, and if yes, the receiving of the retransmitted data ends; otherwise the procedure proceeds to the retransmission times determining step.

According to a further embodiment of the method of receiving multimedia broadcast/multicast data, when the check report indicates there are both basic layer and enhanced layer data errors, the method further includes an analyzing step before the checking step. And in the analyzing step, specific constellation points on the first constellation map whose last two bits are the same with the last two bits of the sequenced retransmitted data are found, a coordinate system of the first constellation map is translated to a center of the specific constellation points, the sequenced retransmitted data are mapped to the translated coordinate system, distances between the mapping point and the specific constellation points are computed and a specific constellation point closest to the mapping point is found as the sequenced retransmitted data.

According to a further embodiment of the method of receiving multimedia broadcast/multicast data, when the check report indicates there are both basic layer and enhanced layer data errors, before exchanging the last two bits of the enhanced layer and the first two bits of the basic layer of the retransmitted data, the method further includes: demodulating the first two bits A of the basic layer during a first transmission and demodulating the first two bits B of the basic layer during a retransmission and if a maximum likelihood of $A \geq$ a maximum likelihood of B, finding specific constellation points on the second constellation map whose last two bits are the same with A, translating the coordinate system of the second constellation map to a center of the specific constellation points, mapping the retransmitted data to the translated coordinate system and then computing distances between the mapping point and the specific constellation points and finding a specific constellation point closest to the mapping point as the retransmitted data; if the maximum likelihood of A<the maximum likelihood of B, after the sequence step in which the last two bits of the EL and the first two bits of the BL of the retransmitted data are exchanged, finding specific constellation points on the first constellation map whose last two bits are the same with the last two bits of the sequenced retransmitted data, translating the coordinate system of the first constellation map to a center of the specific constellation points, mapping the sequenced retransmitted data to the translated coordinate system and then computing distances between the mapping point and the specific constellation points and finding a specific constellation point closest to the mapping point as the sequenced retransmitted data.

According to a further embodiment of the method of receiving multimedia broadcast/multicast data, after the step of determining whether the check report indicates there are both basic layer and enhanced layer data errors, the method further includes: determining a data order in a control signaling of the retransmitted data and if the data order is from the basic layer to the enhanced layer, demodulating the retransmitted data with the second constellation map, checking in the order of the retransmitted data and transmitting a check report; otherwise demodulating the retransmitted data with the second constellation map, exchanging the last two bits of the enhanced layer and the first two bits of the basic layer of the retransmitted data and sequencing the retransmitted data, checking the sequenced retransmitted data and transmitting a check report.

According to a further embodiment of the method of receiving multimedia broadcast/multicast data, intervened constellation points on the first constellation map and second constellation map have a same last two bits and the constellation points with the same last two bits are distributed evenly on the first constellation map and second constellation map; the constellation points on the first constellation map and second constellation map have different hierarchical gains.

According to a further embodiment of the method of receiving multimedia broadcast/multicast data, the constellation points on the first constellation map and second constellation map having different hierarchical gains comprises: translating constellation points in a first quadrant of the first constellation map to a third quadrant of the second constellation map, translating constellation points in a second quadrant of the first constellation map to a fourth quadrant of the second constellation map, translating constellation points in a third quadrant of the first constellation map to a first quadrant of the second constellation map, and translating constellation points in a fourth quadrant of the first constellation map to a second quadrant of the second constellation map.

In order to achieve the above objective, an embodiment of the present invention provides an apparatus for receiving multimedia broadcast/multicast data based on hierarchical modulation, including a communication unit, a receiving unit, a determining unit, an analyzing unit, an enhanced layer analyzing unit and a basic layer analyzing unit. Wherein the receiving unit obtains through the communication unit the data transmitted from a transmitter, demodulates the received data with a first constellation map, checks in an order from a basic layer to an enhanced layer and transmits a check report. The communication unit receives retransmitted data from the transmitter and the determining unit determines according to the check report and if there are both enhanced layer and basic layer data errors, the analyzing unit is called; if there is only the basic layer data error, the basic layer analyzing unit is called; and if there is only the enhanced layer data error, the enhanced layer analyzing unit is called The analyzing unit demodulates the data with a second constellation map, exchanges the last two bits of the enhanced layer and the first two bits of the basic layer and sequences the retransmitted data, checks the sequenced retransmitted data and transmits a check report to the communication unit for further transmission. The enhanced layer analyzing unit demodulates the retransmitted data with the first constellation map, exchanges the last two bits of the enhanced layer and the first two bits of the basic layer of the retransmitted data and sequences the retransmitted data, checks the sequenced retransmitted data and transmits the sequenced retransmitted data to the communication unit for further transmission. The basic layer analyzing unit demodulates the retransmitted data with the second constellation map, checks the retransmitted data and transmits the retransmitted data to the communication unit for further retransmission.

According to a further embodiment of the apparatus for receiving multimedia broadcast/multicast data, the apparatus further includes a retransmission times determining unit connected between the determining unit and the communication unit and for determining whether the retransmission times exceed a threshold and if yes the receiving of the data is stopped.

According to a further embodiment of the apparatus for receiving multimedia broadcast/multicast data, the communication unit determines whether the apparatus has received the data correctly and if yes, the receiving of the retransmitted data ends; otherwise the retransmitted data are transmitted to the retransmission times determining unit.

According to a further embodiment of the apparatus for receiving multimedia broadcast/multicast data, when the check report indicates there are both basic layer and enhanced layer data errors and before checking, the analyzing unit finds specific constellation points on the first constellation map whose last two bits are the same with the last two bits of the sequenced retransmitted data, translates a coordinate system of the first constellation map to a center of the specific constellation points, maps the sequenced retransmitted data to the translated coordinate system, computes distances between a mapping point and the specific constellation points and finds a specific constellation point closest to the mapping point as the sequenced retransmitted data.

According to a further embodiment of the apparatus for receiving multimedia broadcast/multicast data, before the analyzing unit exchanges the last two bits of the enhanced layer and the first two bits of the basic layer of the retransmitted data, the apparatus further demodulates the first two bits A of the basic layer during a first transmission and demodulates the first two bits B of the basic layer during a retransmission and if a maximum likelihood of A≧a maximum likelihood of B, finds specific constellation points on the second constellation whose last two bits are the same with A, translates the coordinate system of the second constellation map to a center of the specific constellation points, maps the retransmitted data to the translated coordinate system and then computes distances between the mapping point and the specific constellation points and finds a specific constellation point closest to the mapping point as the retransmitted data; if the maximum likelihood of A<the maximum likelihood of B, after the last two bits of the EL and the first two bits of the BL of the retransmitted data are exchanged, finds specific constellation points on the first constellation map whose last two bits are the same with the last two bits of the sequenced retransmitted data, translates the coordinate system of the first constellation to a center of the specific constellation points, maps the sequenced retransmitted data to the translated coordinate system and then computes distances between the mapping point and the specific constellation points and finds a specific constellation point closest to the mapping point as the sequenced retransmitted data.

According to a further embodiment of the apparatus for receiving multimedia broadcast/multicast data, the determining unit further comprises determining a data order in a control signaling of the retransmitted data and if the data order is from the basic layer to the enhanced layer, the basic layer analyzing unit is called; otherwise the analyzing unit is called.

According to a further embodiment of the apparatus for receiving multimedia broadcast/multicast data, intervened constellation points on the first constellation map and second constellation map have a same last two bits and the constellation points with the same last two bits are distributed evenly on the first constellation map and second constellation map; the constellation points on the first constellation map and second constellation map have different hierarchical gains.

According to a further embodiment of the apparatus for receiving multimedia broadcast/multicast data, the constellation points on the first constellation map and second constellation map having different hierarchical gains comprises: translating constellation points in a first quadrant of the first constellation map to a third quadrant of the second constellation map, translating constellation points in a second quadrant of the first constellation map to a fourth quadrant of the second constellation map, translating constellation points in a third quadrant of the first constellation map to a first quadrant of the second constellation map, and translating constellation points in a fourth quadrant of the first constellation map to a second quadrant of the second constellation map.

The beneficial effects of the embodiments of the present invention include that: the last two bits of the EL and the first two bits of the BL are exchanged during the retransmission according to the first constellation which has set therein intervened constellation points with the same last two bits and according to the second constellation which has a hierarchical gain over the first constellation, so that a good gain can be obtained through one retransmission; interferences from a lot of unrelated constellation points can be avoided by finding specific constellation points on the constellation which have the same last two bits with the transmitted data, so that the reception can be more accurate; the analysis can be more accurate by finding specific constellation points, translating the coordinate system and obtaining other part of the data according to a part of data; and the retransmission times are reduced, the ratio of demodulating correctly is improved and the user data throughput is enhanced.

In order to make the objective, technical solution and advantages of the present invention more apparent, a further detailed description will be given with reference to the embodiments and accompanied drawings. Herein, the exemplary embodiments and the related description are only for illustrating the present invention and are not intended to limit the present invention.

Embodiments of the present invention provide methods for transmitting and receiving multimedia broadcast/multicast data based on a hierarchical modulation and corresponding apparatuses. The present invention will be described in detail with reference to the accompanied drawings.

Figure 6:
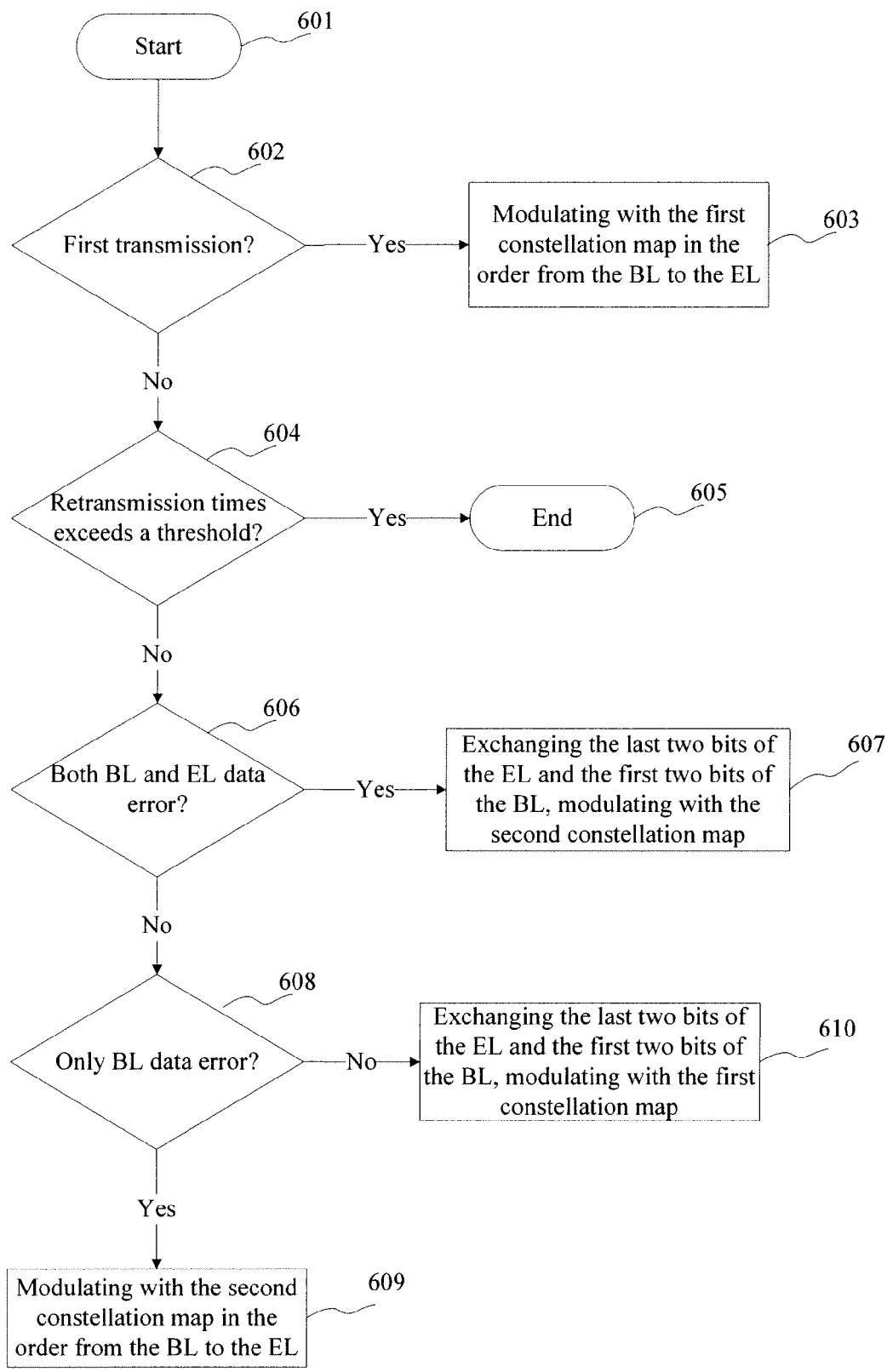
FIG. 6 is a flow chart showing a method of transmitting multimedia multicast data according to an embodiment of the present invention.

FIG. 6 is a flow chart showing a method of transmitting multimedia multicast data according to an embodiment of the present invention and including the following steps.

In step 601, the procedure starts.

In step 602, it is determined whether it is the first transmission of data and if yes, the procedure proceeds to step 603; otherwise, the procedure proceeds to step 604.

In step 603, the data are modulated with the first constellation map in an order from a BL to an EL and then transmitted.

In step 604, a check report returned from a receiving apparatus is received, the retransmission times are counted and it is determined whether the counted number exceeds a threshold (in this example, the threshold of the retransmission times is preset to 3) and if the counted number exceeds the threshold, the procedure proceeds to step 605; otherwise, the procedure proceeds to step 606.

In step 605, the procedure ends.

In step 606, it is determined whether the BL and EL data received by the receiving apparatus both have an error according to the check report and if yes, the procedure proceeds to step 607; otherwise the procedure proceeds to step 608.

In step 607, when retransmitting, the last two bits of the EL are exchanged with the first two bits of the BL and the data are modulated with the second constellation map and then transmitted.

In step 608, it is determined whether there is only BL data error, and if yes, the procedure proceeds to step 610; otherwise the procedure proceeds to step 609.

In step 609, if there is only EL data error, the last two bits of the EL and the first two bits of the BL are exchanged, the data are modulated with the first constellation map and then retransmitted to the receiving apparatus.

In step 610, if there is only BL data error, the data are modulated with the second constellation map in the order from the BL to the EL and then retransmitted to the receiving apparatus.

As a preferred embodiment, for the QPSK+64QAM hierarchical modulation, if there is only EL error in the check report received by the transmitter for the first time, the last two bits of the EL and the first two bits of the BL are exchanged, the data are modulated with the first constellation map and then retransmitted to the receiving apparatus. That is to say, if there is still only EL error in the check report returned for the second time after the step 609, the first two bits of the EL and the first two bits of the BL are exchanged, the data are modulated with the first constellation map and then retransmitted to the receiving apparatus.

Figure 7:
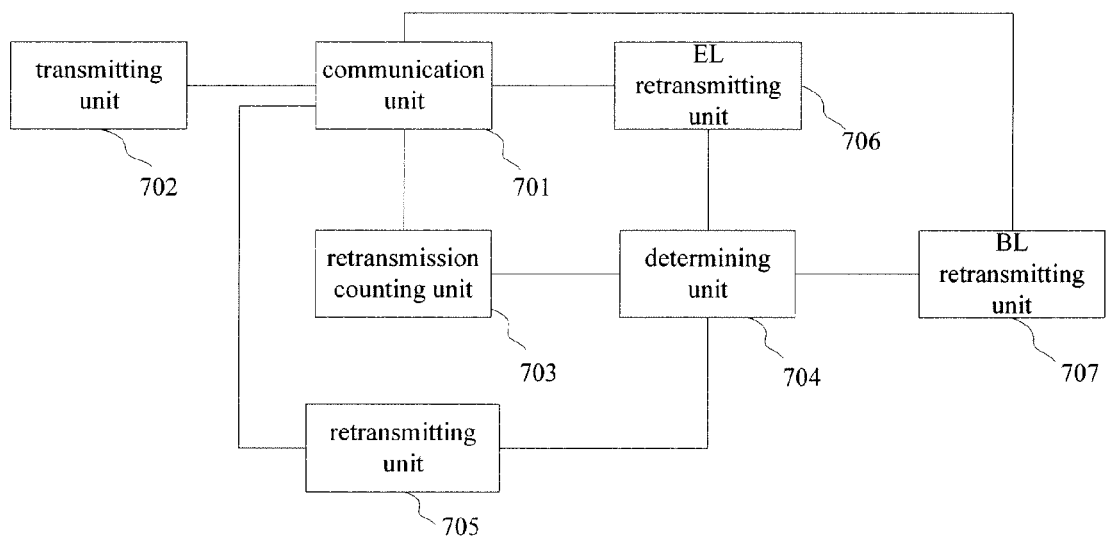
FIG. 7 is a diagram showing a structure of an apparatus for transmitting multimedia multicast data according to an embodiment of the present invention.

FIG. 7 is a diagram showing a structure of an apparatus for transmitting multimedia multicast data according to an embodiment of the present invention. The transmitting apparatus includes a communication unit 701, a transmitting unit 702, a retransmission counting unit 703, a determining unit 704, a retransmitting unit 705, an EL retransmitting unit 706 and a BL retransmitting unit 707.

The transmitting unit 702 is connected with the communication unit 701, the retransmission counting unit 703 is connected with the communication unit 701, the retransmitting unit 705 is connected with the communication unit 701, the determining unit 704 is connected with the retransmission counting unit 705, the EL retransmitting unit 706 is connected with the determining unit 704, the BL retransmitting unit 707 is connected with the determining unit 704, the retransmitting unit 705 is connected with the determining unit 704, the EL retransmitting unit 706 is connected with the communication unit 701, and the BL retransmitting unit 707 is connected with the communication unit 701.

The communication unit 701 is for transmitting signals and receiving the check report returned from the receiving apparatus.

The transmitting unit 702 is for modulating the data with the first constellation map in the order from the BL to the EL and transmitting the data to the communication unit 701 for further transmission.

The retransmission counting unit 703 is for counting the retransmission times and if the retransmission times exceed the threshold, the retransmission is stopped.

The determining unit 704 determines if there is only EL data error according to the check report from the receiving apparatus, the EL retransmitting unit 706 is called; if there is only BL data error according to the check report from the receiving apparatus, the BL retransmitting unit 707 is called; and if there are both EL and BL data errors according to the check report from the receiving apparatus, the retransmitting unit 705 is called.

The retransmitting unit 705 is for exchanging the last two bits of the EL and the first two bits of the BL, modulating the data with the second constellation map and then transmitting the data to the communication unit 701 for further transmission.

The EL retransmitting unit 706 is for exchanging the last two bits of the EL and the first two bits of the BL, modulating the data with the first constellation map and then transmitting the data to the communication unit 701 for further transmission.

As a preferred embodiment, for QPSK+64QAM hierarchical modulation, if there is only EL error in the check report received by the transmitter for the first time, the EL retransmitting unit 706 exchanges the last two bits of the EL and the first two bits of the BL, modulates the data with the first constellation map and then retransmits the data to the receiving apparatus. If there is still only EL error in the check report returned from the receiving apparatus for the second time, the EL retransmitting unit 706 exchanges the first two bits of the EL and the first two bits of the BL, modulates the data with the first constellation map and then retransmits the data to the receiving apparatus.

The BL retransmitting unit 707 is for modulating the data with the second constellation map in the order from the BL to the EL and then transmitting the data to the communication unit 701 for further transmission.

The transmitting unit 702 modulates the data with the first constellation map in the order from the BL to the EL and transmits the data to the communication unit 701 for further transmission. The communication unit 701 receives the check report returned from the receiving apparatus. The retransmission counting unit 703 counts the retransmission times and determines if the retransmission times exceed the preset threshold (for example, 3), the transmission procedures ends;

otherwise the determining unit 704 determines the type of error in the check report. If there are both EL and BL data errors, the retransmitting unit 705 is called, if there is only BL data error, the BL retransmitting unit 707 is called, and if there is only EL data error, the EL retransmitting unit 706 is called. The retransmitting unit 705 exchanges the last two bits of the EL and the first two bits of the BL, modulates the data with the second constellation map and then transmits the modulated data to the communication unit 701 for further retransmission. The EL retransmitting unit 706 exchanges the last two bits of the EL and the first two bits of the BL, modulates the data with the first constellation map and then transmits the data to the communication unit 701 for further retransmission. The BL retransmitting unit 707 modulates the data with the second constellation map in the order from the BL to the EL and then transmits the data to the communication unit 701 for further retransmission.

Figure 8:
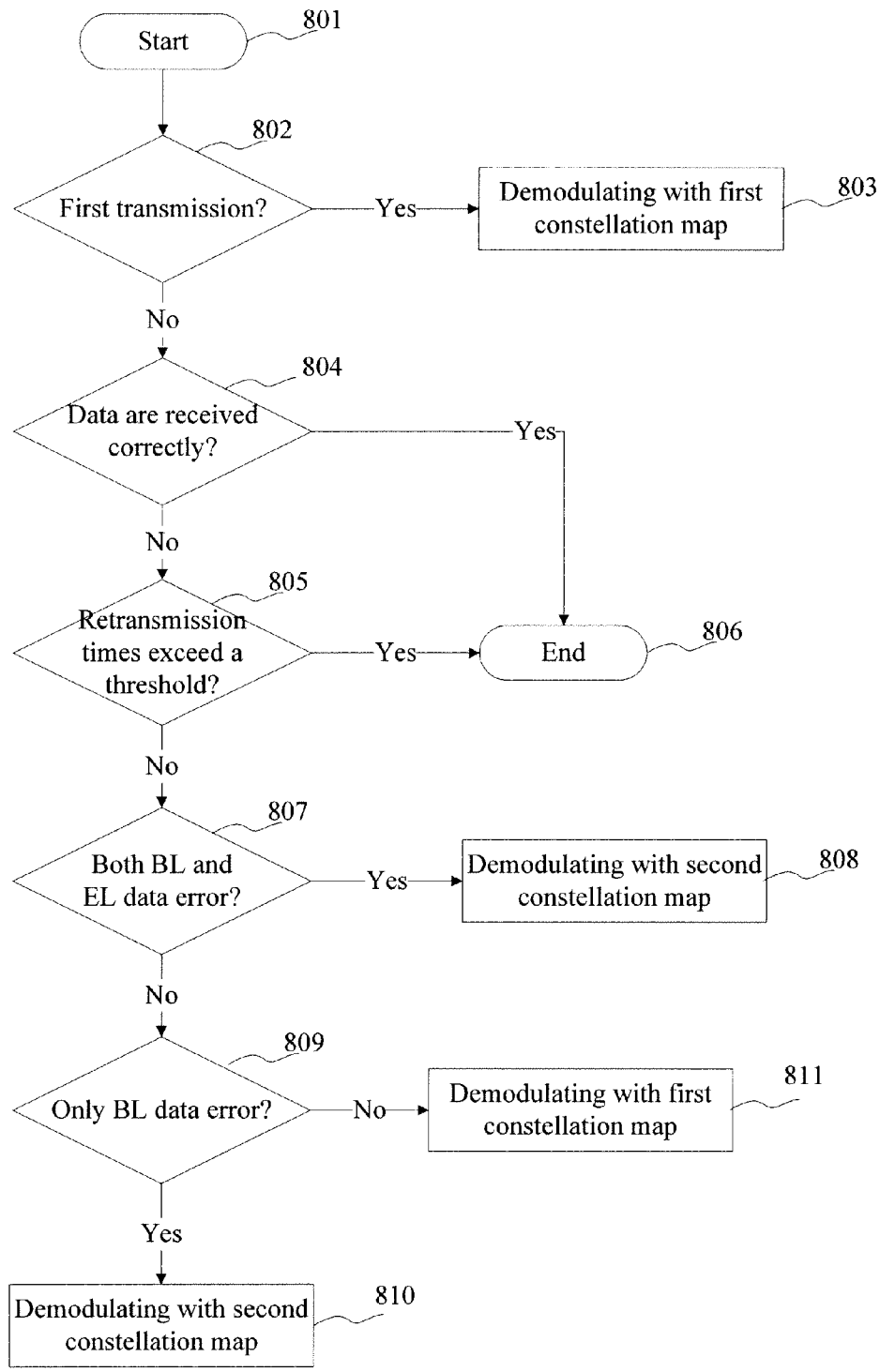
FIG. 8 is a flow chart showing a method of receiving multimedia multicast data according to an embodiment of the present invention.

FIG. 8 is a flow chart showing a method of receiving multimedia multicast data according to an embodiment of the present invention and including the following steps.

In step 801, the procedure starts.

In step 802, it is determined whether it is the first receiving of data and if yes, the procedure proceeds to step 803; otherwise, the procedure proceeds to step 804.

In step 803, the received data are demodulated with the first constellation map and the demodulated data are in the order from the BL to the EL and then a check report of the BL and/or EL is returned to the transmitting apparatus.

In step 804, the receiving apparatus determines whether the data has been received correctly (i.e. the data need not be retransmitted) according to the returned check report, and if yes, the procedure proceeds to step 806; otherwise the procedure proceeds to step 805.

In step 805, it is determined whether the retransmission times exceed a threshold (in this example, the threshold of the retransmission times is preset to 3) and if yes, the procedure proceeds to step 806; otherwise, the procedure proceeds to step 807.

In step 806, the procedure ends.

In step 807, it is determined whether the BL and EL data both have an error and if yes, the procedure proceeds to step 808; otherwise the procedure proceeds to step 809.

In step 808, when the retransmitted data are received, the data are demodulated with the second constellation map, the last two bits of the EL and the first two bits of the demodulated data are exchanged and the retransmitted data are sequenced to constitute the BL and EL of the received data, then the sequenced retransmitted data are checked and a check report is returned. The check report includes: retransmission times, information indicating that the data is received correctly, information indicating that there is only EL data error, information indicating that there is only BL data error or information indicating that there are both the EL and BL error. The check may adopt the CRC method to check the demodulated data but the present invention is not limited to the CRC method.

In step 809, the retransmitted data are received, and if there is only BL data error in the last check report during the last retransmission, the procedure proceeds to step 810; otherwise the procedure proceeds to step 811.

In step 810, if there is only BL data error, the received data are demodulated with the second constellation map and the demodulated data are in the order from the BL to the EL and then a check report is returned to the transmitting apparatus.

In step 811, if there is only EL data error, the data are demodulated with the first constellation map, the last two bits of the EL and the first two bits of the demodulated retransmitted data are exchanged and the retransmitted data are sequenced to constitute the BL and EL of the received data, then the sequenced retransmitted data are checked and a check report is returned to the transmitting apparatus.

Herein, in step 811, as a preferred embodiment, for the QPSK+64QAM hierarchical demodulation, if the there is only EL data error in the check reports returned from the receiver for the first time and the second time, when the transmitter retransmits data again, the receiving apparatus obtains the data order according to the data retransmitted from the transmitter, demodulates the retransmitted data with the first constellation map, exchanges the first two bits of the EL and the first two bits of the BL and sequences the retransmitted data to constitute the BL and EL of the received data, then checks the sequenced retransmitted data and returns the check report to the transmitting apparatus.

In step 808, there is an analysis step before the check step. In the analysis step, specific constellation points on the first constellation map whose last two bits are the same with the last two bits of the EL are found according to the demodulated EL, the coordinate system is translated to the center of the specific constellation points and the specific constellation points with the same last two bits in the four quadrants are made in symmetry with respect to the coordinate axis; the distances between the mapping point of the sequenced retransmitted data and the specific constellation points in the coordinate system are analyzed, and the bit value of the specific constellation point which is closest to the mapping point is the bit value of the mapping point. The BL and EL of the mapping point are checked and a BL check report is returned to the transmitting apparatus. If the check result indicates that there is EL data error but no BL data error, the users at the cell border returns a report indicating that the BL data is correct to the transmitting apparatus, retransmitting is stopped and the users at the cell center returns a check report indicating that there is only EL data error to the transmitting apparatus; if the check result indicates that there is BL data error but no EL data error, only a check report indicating that there is only BL data error is returned to the transmitting apparatus; and if the check result indicates that there is both BL data error and EL data error, a check report indicating that there are both BL data error and EL data error is returned to the transmitting apparatus.

In step 808, before exchanging the last two bits of the EL and the first two bits of the BL of the demodulated data, the following steps are included: the users at the cell center and at the cell border demodulate the first two bits A of the BL during the first transmission and demodulate the first two bits B of the BL during the retransmission and if $LLR(A) \geq LLR(B)$, specific constellation points on the second constellation whose last two bits are the same with A are found, the coordinate system of the second constellation map is translated to the center of the specific constellation points, the retransmitted data are mapped to the translated coordinate system and then the distances between the mapping point and the specific constellation points are computed and the specific constellation point closest to the mapping point is found as the retransmitted data; if $LLR(A) < LLR(B)$, after the sequence step in which the last two bits of the EL and the first two bits of the BL of the retransmitted data are exchanged is completed, specific constellation points on the first constellation whose last two bits are the same with the last two bits of the sequenced retransmitted data are found, the coordinate system of the first constellation map is translated to the center of the specific constellation points, the sequenced retransmitted data are mapped to the translated coordinate system and then the distances between the mapping point and the specific constellation points are computed and the specific constellation point closest to the mapping point is found as the sequenced retransmitted data. LLR( ) is a computation for solving the maximum likelihood.

Herein, after step 809, the following steps are included: when some cell users receive the data with BL data error and some cell users receive the data with EL data error, the check report received by the transmitter includes both BL data error and EL data error and the transmitter exchange the last two bits of the EL and the first two bits of the BL, modulates the data with the second constellation map and transmit the modulated data. When the receiver with only the BL data error receives the retransmitted data and finds that the check report doesn't indicate that there are both BL and EL data errors, and the procedure proceeds to step 809. In step 809, the receiver determines whether there is only BL data error. If the order of the currently received retransmitted data is not the normal order from the BL to the EL according to the control signaling in the retransmitted data transmitted from the transmitter, then the procedure proceeds to step 808 to perform the demodulation and check; if the order of the currently received retransmitted data is the normal order from the BL to the EL, the procedure proceeds to step 810 to perform the demodulation and check.

Figure 9:
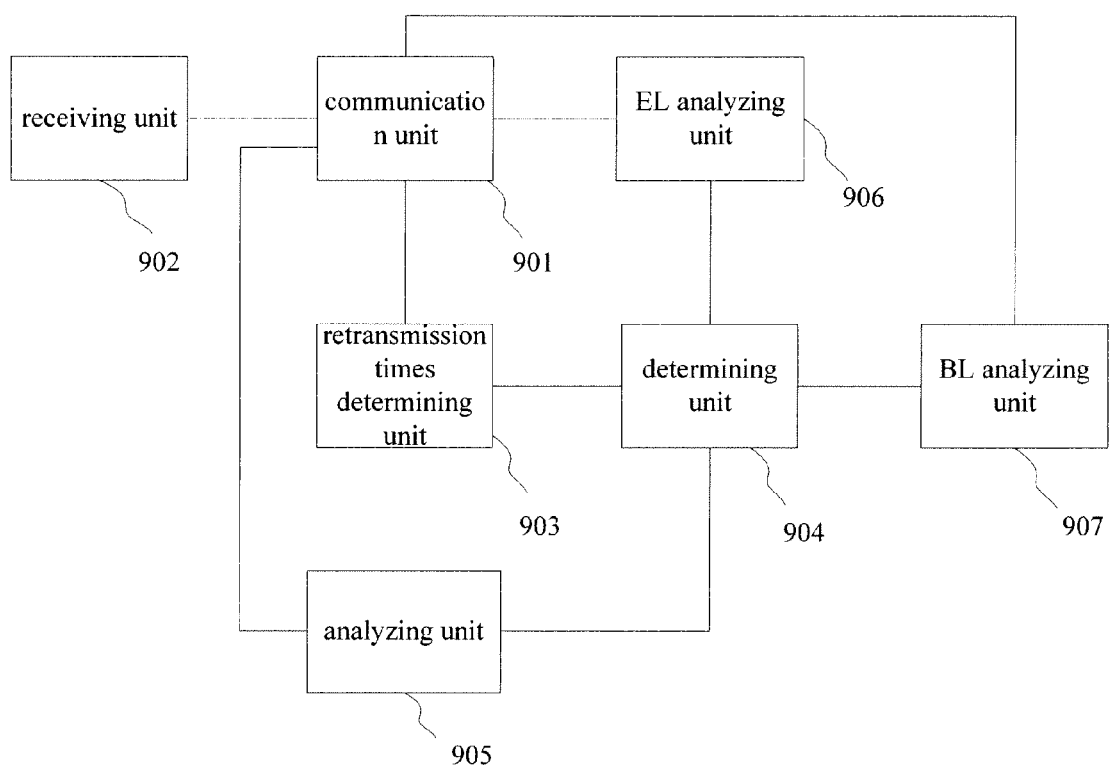
FIG. 9 is a diagram showing a structure of an apparatus for receiving multimedia multicast data according to an embodiment of the present invention.

FIG. 9 is a diagram showing a structure of an apparatus for receiving multimedia multicast data according to an embodiment of the present invention. The receiving apparatus includes a communication unit 901, a receiving unit 902, a retransmission times determining unit 903, a determining unit 904, an analyzing unit 905, an EL analyzing unit 906 and a BL analyzing unit 907.

The receiving unit 902 is connected with the communication unit 901, the retransmission times determining unit 903 is connected with the communication unit 901, the analyzing unit 905 is connected with the communication unit 901, the determining unit 904 is connected with the retransmission times determining unit 903, the EL analyzing unit 906 is connected with the determining unit 904, the BL analyzing unit 907 is connected with the determining unit 904, the analyzing unit 905 is connected with the determining unit 904, the EL analyzing unit 906 is connected with the communication unit 901, and the BL analyzing unit 907 is connected with the communication unit 901.

The communication unit 901 is for receiving signals and transmitting the check report of the receiving apparatus, determining whether the receiving apparatus has received the data correctly (i.e. the data need not be retransmitted) according to the check report and if yes, the procedure ends.

The receiving unit 902 is for demodulating the data with the first constellation map in the order from the BL to the EL, generating and transmitting a demodulation result check report to the communication unit 901 for further transmission.

The retransmission times determining unit 903 determines whether the retransmission times exceed the threshold, and if the retransmission times exceed the threshold, the retransmission is stopped.

The determining unit 904 determines that if there are both BL and EL data errors, the analyzing unit 905 is called; if there is only EL data error, the EL analyzing unit 906 is called; if there is only BL data error, the BL analyzing unit 907 is called.

The analyzing unit 905 demodulates the retransmitted data with the second constellation map, exchanges the last two bits of the EL and the first two bits of the BL and sequences the retransmitted data, checks the sequenced retransmitted data and transmits a check report to the communication unit 901 for further transmission.

The EL analyzing unit 906 demodulates the retransmitted data with the first constellation map, exchanges the last two bits of the EL and the first two bits of the BL and sequences the retransmitted data, checks the sequenced retransmitted data and transmits a check report to the communication unit 901 for further transmission.

As a preferred embodiment, for QPSK+64QAM hierarchical demodulation, if the EL analyzing unit 906 returns the check reports for the first time and second time both indicating there is only EL data error, when the transmitter retransmits data again, the EL analyzing unit 906 obtains the data order according to the data retransmitted from the transmitter, demodulates the retransmitted data with the first constellation map, exchanges the first two bits of the EL and the first two bits of the BL, sequences the data to constitute the BL and EL of the received data, checks the sequenced retransmitted data and returns a check report to the transmitting apparatus.

The BL analyzing unit 907 demodulates the retransmitted data with the second constellation map, checks the retransmitted data and transmits a check report to the communication unit 901 for further transmission.

The communication unit 901 receives the data transmitted from the transmitting apparatus and sends the data to the receiving unit 902. The receiving unit 902 demodulates the data with the first constellation map, checks the data in the order from the BL to the EL, generates a check report and transmits the check report to the communication unit 901 for further transmission. The communication unit 901 receives the retransmitted data from the transmitting apparatus, determines whether the receiving apparatus has received the data correctly (i.e. the data need not be retransmitted) according to the check report and if yes, the procedure ends; otherwise, the communication unit 901 transmits the data to the retransmission times determining unit 903. If the retransmission times do not exceed a preset retransmission times, the retransmitted data are transmitted to the determining unit 904; otherwise the procedure ends. The determining unit 904 determines according to the check report that if there are both EL and BL data error, the analyzing unit 905 is called; if there is only EL data error, the EL analyzing unit 906 is called; and if there is only BL data error, the BL analyzing unit 907 is called. The analyzing unit 905 demodulates the retransmitted data with the second constellation map, exchanges the last two bits of the EL and the first two bits of the BL and sequences the retransmitted data, checks the sequenced retransmitted data and transmits a check report to the communication unit 901 for further transmission. The EL analyzing unit 906 demodulates the retransmitted data with the first constellation map, exchanges the last two bits of the EL and the first two bits of the BL and sequences the retransmitted data, checks the sequenced retransmitted data and transmits a check report to the communication unit 901 for further transmission. The BL analyzing unit 906 demodulates the retransmitted data with the second constellation map, checks the data in the order from the BL to the EL and transmits a check report to the communication unit 901 for further transmission.

The analyzing unit 905 further analyzes the received data, finds specific constellation points on the first constellation map whose last two bits are the same with the last two bits of the EL according to the EL of the sequenced retransmitted data, translates the coordinate system to the center of the specific constellation points and makes the specific constellation points with the same last two bits in the four quadrants in symmetry with respect to the coordinate axis, and analysis the distances between the mapping point of the sequenced retransmitted data and the specific constellation points in the coordinate system, wherein the bit value of the specific constellation point which is closest to the mapping point is the bit value of the mapping point. The BL and EL of the mapping point are checked and a BL check report is returned to the transmitting apparatus. If the check result indicates that there is EL data error but no BL data error, the users at the cell border returns a report indicating that the BL data is correct to the transmitting apparatus, retransmitting is stopped and the users at the cell center returns a check report indicating that there is only EL data error to the transmitting apparatus; if the check result indicates that there is BL data error but no EL data error, only a check report indicating that there is only BL data error is returned to the transmitting apparatus; and if the check result indicates that there are both BL data error and EL data error, a check report indicating that there are both BL data error and EL data error is returned to the transmitting apparatus.

The analyzing of the retransmitted data by the analyzing unit 905 further includes: before exchanging the last two bits of the EL and the first two bits of the BL of the demodulated data, the receiving apparatuses of the users at the cell center and at the cell border demodulate the first two bits A of the BL during the first transmission and demodulate the first two bits B of the BL during the retransmission and if $LLR(A) \geq LLR(B)$, specific constellation points on the second constellation map whose last two bits are the same with A are found, the coordinate system of the second constellation map is translated to the center of the specific constellation points, the retransmitted data are mapped to the translated coordinate system and then the distances between the mapping point and the specific constellation points are computed and the specific constellation point closest to the mapping point is found as the retransmitted data; if $LLR(A)<LLR(B)$, after the sequence step in which the last two bits of the EL and the first two bits of the BL of the retransmitted data are exchanged, specific constellation points on the first constellation map whose last two bits are the same with the last two bits of the sequenced retransmitted data are found, the coordinate system of the first constellation map is translated to the center of the specific constellation points, the sequenced retransmitted data are mapped to the translated coordinate system and then the distances between the mapping point and the specific constellation points are computed and the specific constellation point closest to the mapping point is found as the sequenced retransmitted data.

The determining unit 904 further determines the data order in the control signaling of the retransmitted data and if the order of the received retransmitted data is the order from the BL to the EL, the BL analyzing unit is called; otherwise the analyzing unit is called.

Figure 10A:
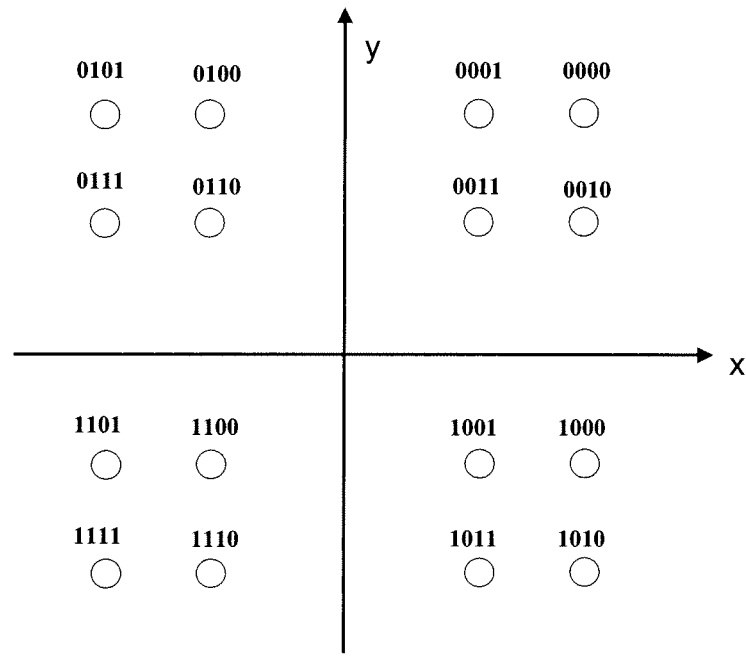
FIG. 10A shows a first constellation map for a 16QAM+ QPSK hierarchical modulation according to a first embodiment of the present invention.
Figure 10B:
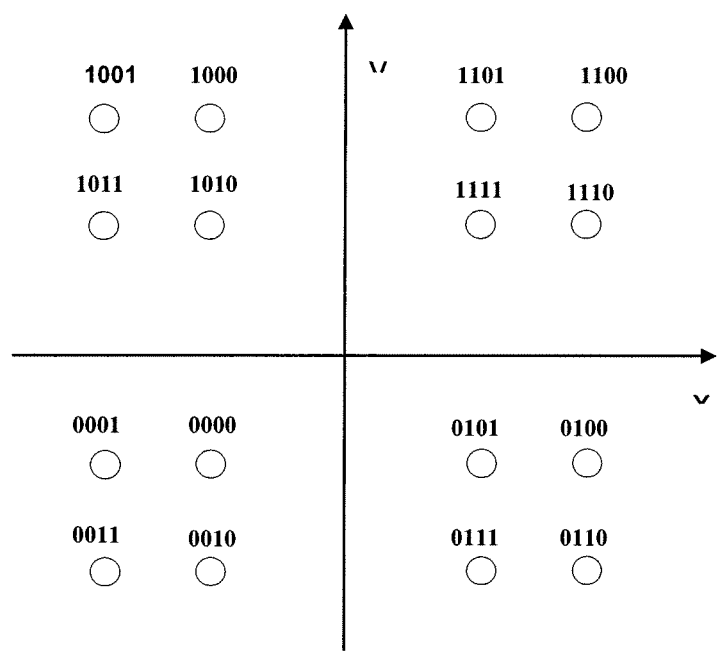
FIG. 10B shows a second constellation map for a 16QAM+ QPSK hierarchical modulation according to the first embodiment of the present invention.

FIG. 10A shows a first constellation map for a 16QAM+QPSK hierarchical modulation according to the first embodiment of the present invention. FIG. 10B shows a second constellation map for a 16QAM+QPSK hierarchical modulation according to the first embodiment of the present invention.

Figure 10C:
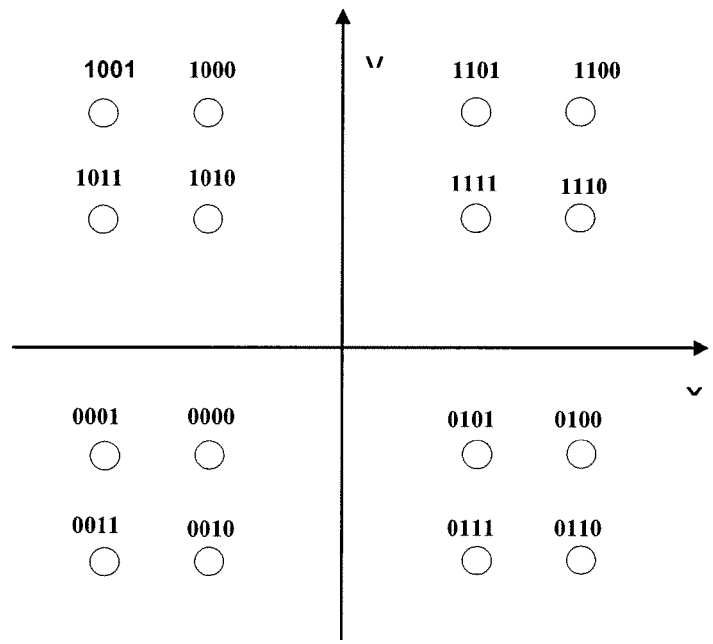
FIG. 10C shows a first constellation map for a 16QAM+ QPSK hierarchical modulation according to a second embodiment of the present invention.
Figure 10D:
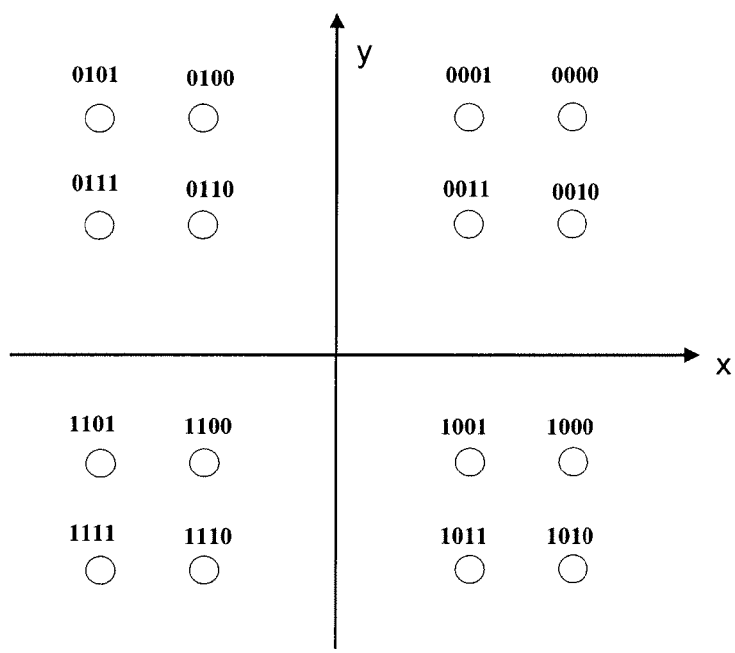
FIG. 10D shows a second constellation map for a 16QAM+ QPSK hierarchical modulation according to the second embodiment of the present invention.
Figure 10E:
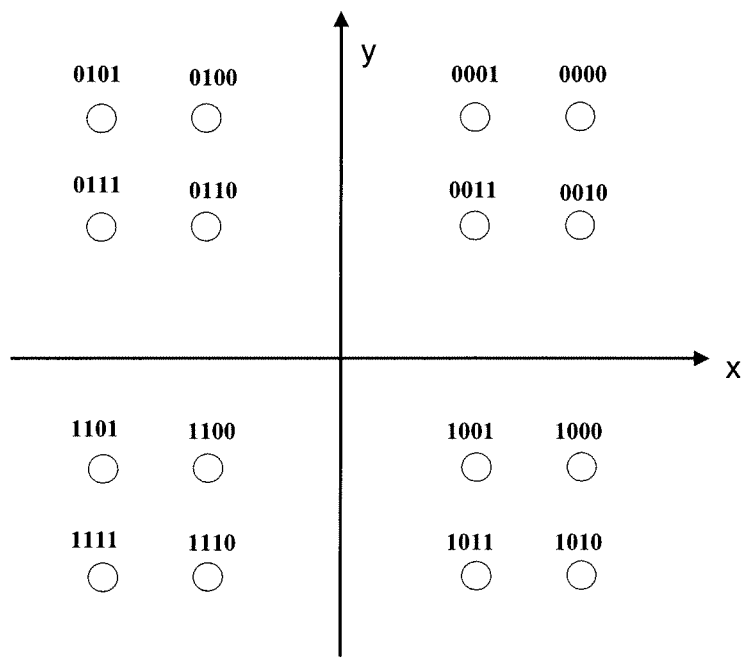
FIG. 10E shows a first constellation map for a 16QAM+ QPSK hierarchical modulation according to a third embodiment of the present invention.
Figure 10F:
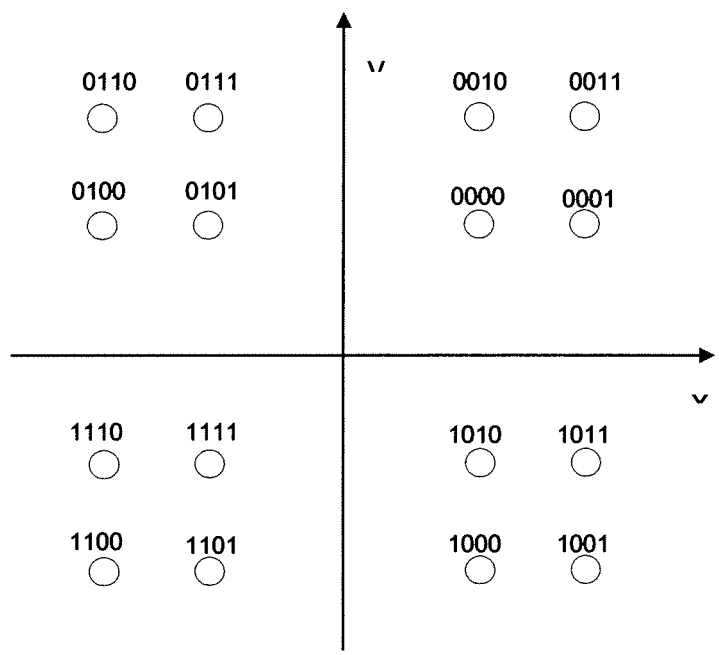
FIG. 10F shows a second constellation map for a 16QAM+ QPSK hierarchical modulation according to the third embodiment of the present invention.

Distances between constellation points with the same EL on the first constellation map and the second constellation map are better as large as possible and constellation points with the same last two bits on the first constellation map and the second constellation map are distributed evenly, i.e. every two intervened constellation points have the same last two bits so that the objective that the reliability of demodulation during the retransmission is improved by using a part of information obtained during demodulation is achieved. The constellation point mapped to the first constellation map by each demodulation symbol and the constellation point mapped to the second constellation map by exchanging the order of bits of the BL and EL included in the symbol have constellation hierarchical gains. As a preferred embodiment, on the first constellation map, constellation points in the first quadrant and those in the third quadrant are exchanged, and constellation points in the second quadrant and those in the fourth quadrant are exchanged. However, the present invention is not limited to the preferred embodiment. FIG. 10C shows a first constellation map for a 16QAM+QPSK hierarchical modulation according to the second embodiment of the present invention. FIG. 10D shows a second constellation map for a 16QAM+QPSK hierarchical modulation according to the second embodiment of the present invention. The first constellation map of the second embodiment is the same with the second constellation map of the first embodiment, and the second constellation map of the second embodiment is the same with the first constellation map of the first embodiment. FIG. 10E shows a first constellation map for a 16QAM+QPSK hierarchical modulation according to the third embodiment of the present invention. FIG. 10F shows a second constellation map for a 16QAM+QPSK hierarchical modulation according to the third embodiment of the present invention. The second constellation map shown in FIG. 10F is obtained by exchanging the constellation points in each quadrant in FIG. 10E with respect to the diagonal line.

Figure 11A:
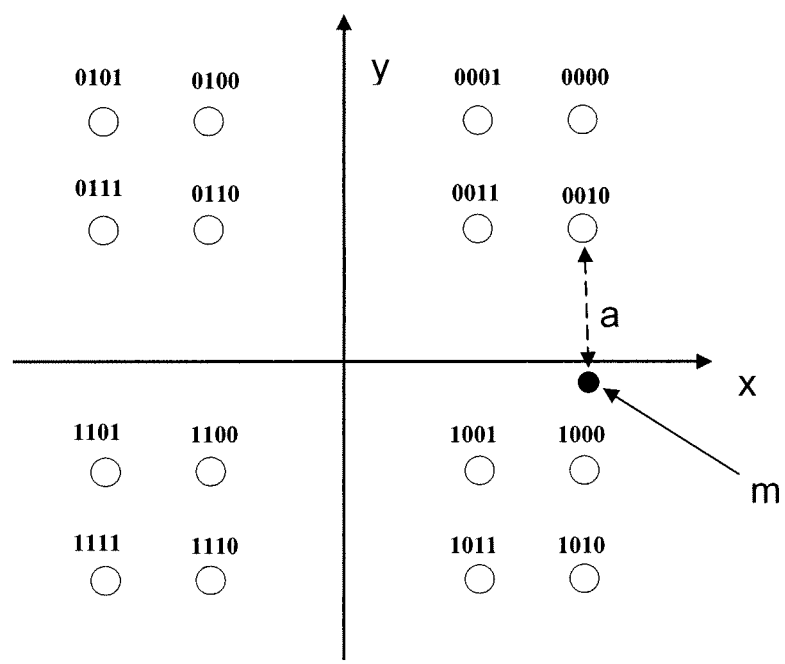
FIG. 11A is a schematic diagram showing that for the 16QAM+QPSK hierarchical modulation, the receiver maps the data received during the transmitting step to the first constellation map of the first embodiment according to one embodiment of the present invention.
Figure 11B:
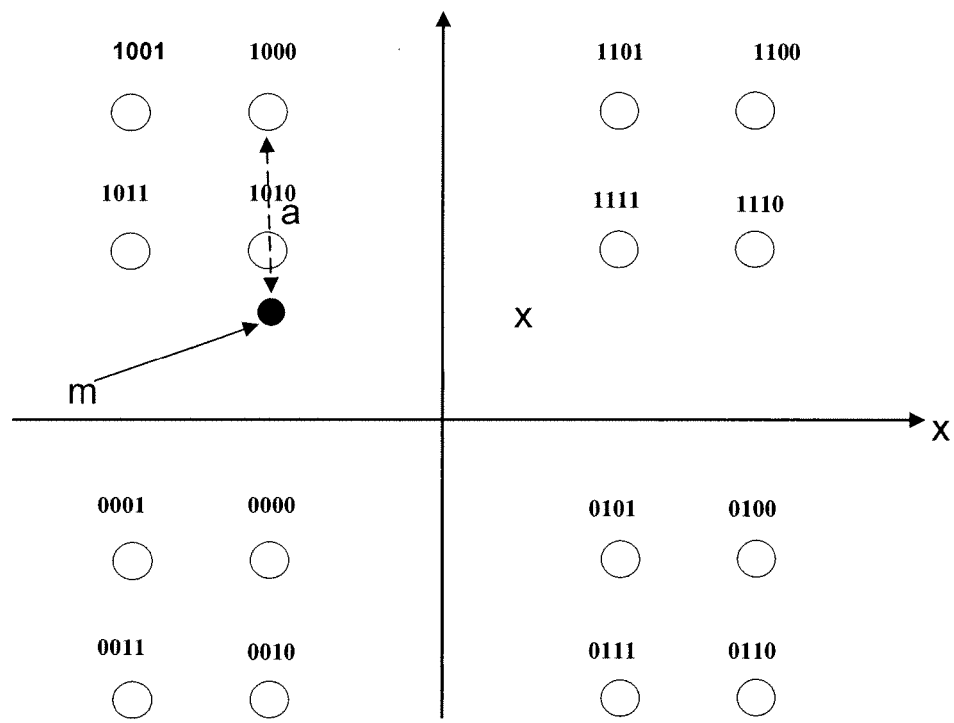
FIG. 11B is a schematic diagram showing that for the 16QAM+QPSK hierarchical modulation, the receiver maps the data received when there are both BL and EL data errors to the second constellation map of the first embodiment according to one embodiment of the present invention.
Figure 11C:
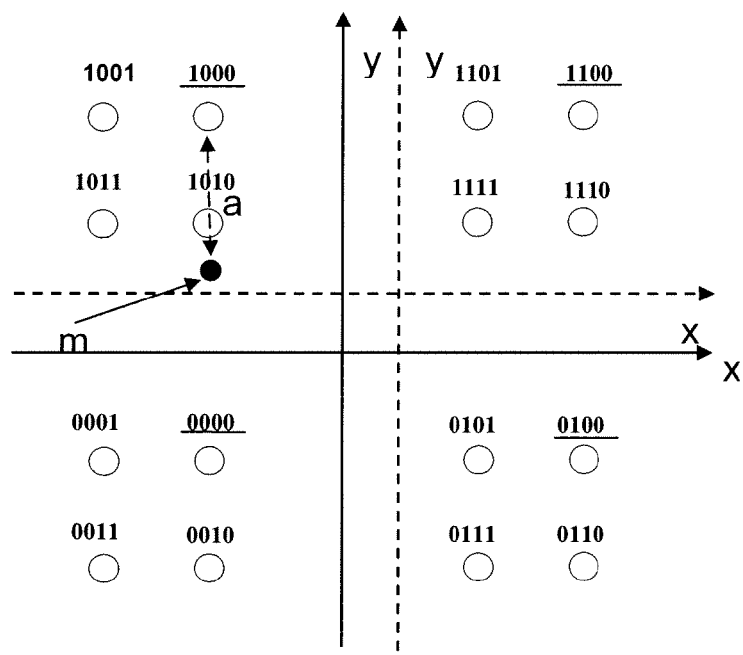
FIG. 11C is a schematic diagram showing that for the 16QAM+QPSK hierarchical modulation, the receiver maps the data received to the second constellation map of the first embodiment and then translates the coordinate system according to one embodiment of the present invention.
Figure 11D:
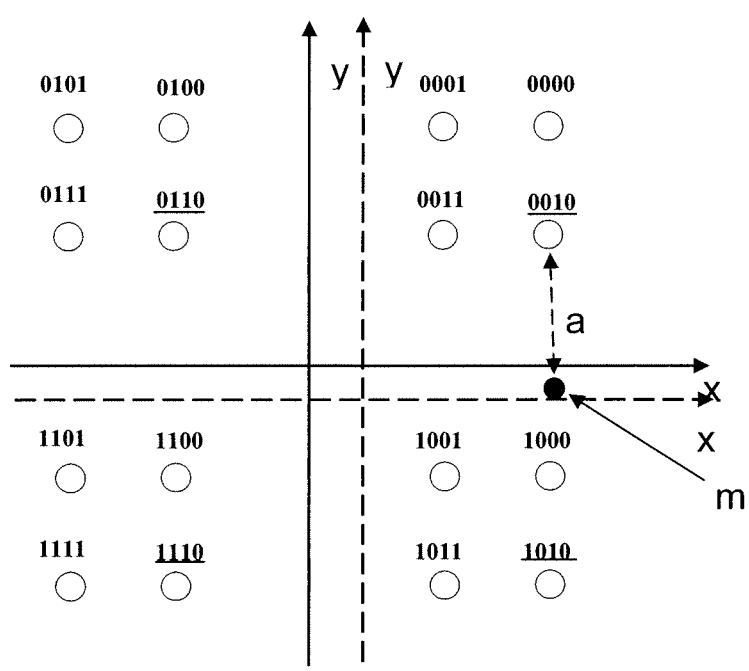
FIG. 11D is a schematic diagram showing that for the 16QAM+QPSK hierarchical modulation, the receiver maps the data received to the first constellation map of the first embodiment and then translates the coordinate system according to one embodiment of the present invention.
Figure 11E:
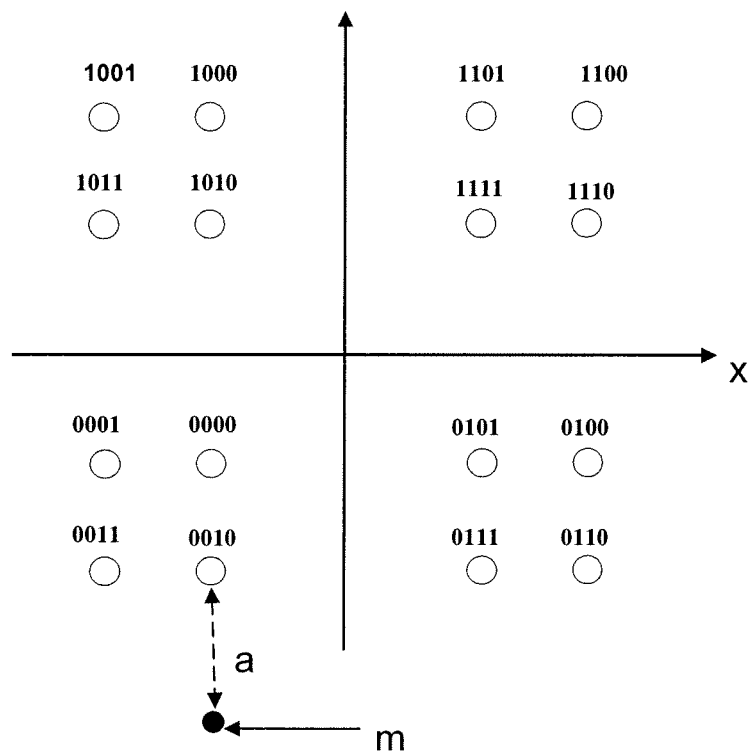
FIG. 11E is a schematic diagram showing that for the 16QAM+QPSK hierarchical modulation, the receiver maps the data received during the retransmission step when there is only BL data error to the second constellation map of the first embodiment according to one embodiment of the present invention.
Figure 11F:
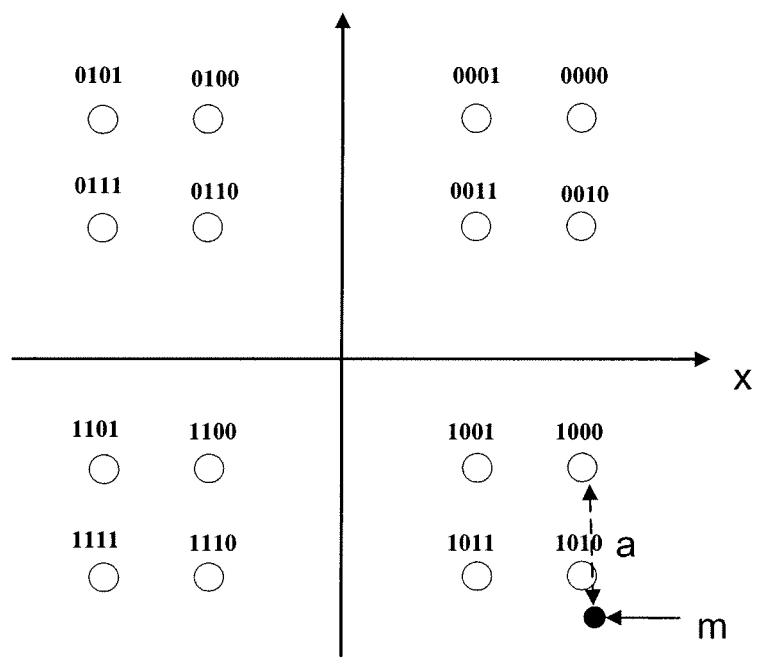
FIG. 11F is a schematic diagram showing that for the 16QAM+QPSK hierarchical modulation, the receiver maps the data received during the retransmission step when there is only EL data error to the first constellation map of the first embodiment according to one embodiment of the present invention.

FIG. 11A is a schematic diagram showing that for the 16QAM+QPSK hierarchical modulation, the receiver maps the data received during the transmitting step to the first constellation map of the first embodiment according to one embodiment of the present invention. FIG. 11B is a schematic diagram showing that for the 16QAM+QPSK hierarchical modulation, the receiver maps the data received when there are both BL and EL data errors to the second constellation map of the first embodiment according to one embodiment of the present invention. FIG. 11C is a schematic diagram showing that for the 16QAM+QPSK hierarchical modulation, the receiver maps the data received to the second constellation map of the first embodiment and then translates the coordinate system according to one embodiment of the present invention. FIG. 11D is a schematic diagram showing that for the 16QAM+QPSK hierarchical modulation, the receiver maps the data received to the first constellation map of the first embodiment and then translates the coordinate system according to one embodiment of the present invention. FIG. 11E is a schematic diagram showing that for the 16QAM+QPSK hierarchical modulation, the receiver maps the data received during the retransmission step when there is only BL data error to the second constellation map of the first embodiment according to one embodiment of the present invention. FIG. 11F is a schematic diagram showing that for the 16QAM+QPSK hierarchical modulation, the receiver maps the data received during the retransmission step when there is only EL data error to the first constellation map of the first embodiment according to one embodiment of the present invention.

Herein, m denotes a mapping point which is obtained by mapping the data received by the receiver to the constellation map, and a denotes a distance between the constellation point and the mapping point. As commonly known in the art, the farer the mapping point is with respect to the coordinate axis, the more accurate the demodulation is.

In this example, the data to be transmitted by the transmitting apparatus is 0010, wherein the BL (C1C2C) is 00 and the EL (C3C4) is 10. Since this is the first transmission of the transmitting unit 702 of the transmitting apparatus, it modulates data 0010 with the first constellation map in the order of C1C2C3C4 and transmits the modulated data to the communication unit 701 for further transmission.

The receiving apparatuses of users at the cell center and at the cell border receive data through the communication unit 901, and obtain that this is the first transmission according to information in the data and then transmit the data to the receiving unit 902. The receiving unit 902 demodulates the data with the first constellation map according to the information in the data. Because of the interference or signal quality, the position of the demodulated data mapped to the first constellation map is shown in FIG. 11A and in this example, the receiving apparatuses of users at the cell center with a high SNR and of users at the cell border with a low SNR receive the data and the distance between the mapping point m of the received data and the constellation point 001001 is a. The receiving unit 902 demodulates and checks the data and returns a check result to the transmitting apparatus through the communication unit 901.

The first case: the communication unit 701 of the transmitting apparatus receives the check report returned from the receiver and finds that there are both BL and EL data errors for the users in the cell, i.e. BL C1C2 error and EL C3C4 error, and the retransmission counting unit 703 performs the retransmission counting and determines whether the retransmission times exceed the preset threshold (3 in this example) and if yes, the procedure ends; otherwise the check report is transmitted to the determining unit 704. The determining unit 704 determines that there are both BL and EL data errors according to the check report and calls the retransmitting unit 705, which exchanges the last two bits (C3C4: 10) of the data 0010 and the first two bits (C1C2: 00) of the BL, i.e. in the order of C3C4C1C2, modulates the data with the second constellation map and transmits the data through the communication unit 701.

The communication units 901 of the receiving apparatuses of users at the cell center and at the cell border receive the retransmitted data at the same time, determine whether to process or abandon the data according to their returned check reports and if the returned check report indicates that the receiving apparatus has received the data correctly, the retransmitted data are abandoned. If the check report indicates that there are both BL and EL data errors, the retransmission times determining unit 903 determines whether the retransmission times exceed the preset threshold (3 in this example) according to the information in the received data and if yes, the procedure ends; if this is the first transmission, the received data are transmitted to the determining unit 904. The determining unit 904 obtains that the data order of this transmission is C3C4C1C2 according to the information in the received data and modulates the received data with the second constellation map and calls the analyzing unit 905. The analyzing unit 905 demodulates the retransmitted data with the second constellation map and obtains the mapping point m. As shown in FIG. 11B, the distance between the mapping point m and the correct constellation point is a.

The analyzing unit 905 may perform the following steps. Since C3C4 are in the BL, it is easy to demodulate C3C4 as 10 in the 16QAM+QPSK hierarchical modulation. The analyzing unit 905 may exchange the first two bits and the last two bits of the retransmitted data according to C3C4 of the data retransmitted this time and sequence the retransmitted data C3C4C1C2 to C1C2C3C4. The analyzing unit 905 finds all the constellation points with the last two bits of 10 on the first constellation map as the specific constellation points and there is one specific constellation point in each quadrant, translates the coordinate system and makes the coordinate origin at the center of the four specific constellation points of the four quadrants, shown as the dashed coordinate system in FIG. 11D, wherein the underlined constellation points are the specific constellation points with the last two bits of 10. If the position of the mapping point m of the sequenced retransmitted data on the translated coordinate system is closest to a specific constellation point, that specific constellation point is regarded as the transmitted data and in this example, the constellation point closest to the mapping point m is 0010. The users at the cell center may obtain C1C2 by analyzing the first constellation map according to C3C4 in the retransmitted data in order to constitute C1C2C3C4. The users at the cell border may obtain C1C2 by analyzing the first constellation map according to C3C4 in the retransmitted data. The analyzing unit 905 checks the sequenced retransmitted data, i.e. checks C1C2 and C3C4. The analyzing unit 905 may adopt the CRC method and returns a check report to the transmitting apparatus through the communication unit 901. If the check is wrong, the report indicating that the BL and/or EL check is wrong can be returned. In this example, the received data obtained by demodulation are the same with the transmitted data so the check result indicates correct, and after the transmitting apparatus receives the check report, the data transmission ends.

The analyzing unit 905 may further perform the following steps. The BL data C1C2* are demodulated during the first transmission and the BL data C3C4* are demodulated during the retransmission. If LLR(C1C2*)≧LLR(C3C4*), it is believed that the reliability that C1C2* during the first transmission are correct is higher than the reliability that C3C4* during the retransmission are correct. The analyzing unit 905 finds all the constellation points with the last two bits of 00 on the second constellation map as the specific constellation points and there is one specific constellation point in each quadrant, translates the coordinate system and makes the coordinate origin at the center of the four specific constellation points of the four quadrants, shown as the dashed coordinate system in FIG. 11C, wherein the underlined constellation points are the specific constellation points with the last two bits of 00. If the position of the mapping point m of the retransmitted data (C3C4C1C2) on the translated coordinate system is closest to a specific constellation point, that specific constellation point is regarded as the transmitted data and in this example, the constellation point closest to the mapping point m is 1000. The users at the cell center may obtain C3C4 by analyzing the second constellation map according to C1C2* in the first transmission. The users at the cell border may obtain C1C2 according to the maximum likelihood estimation. The analyzing unit 905 sequences the analyzed retransmitted data into C1C2C3C4, checks the sequenced retransmitted data, i.e. checks C1C2 and C3C4. The analyzing unit 905 may adopt the CRC method and returns a check report to the transmitting apparatus through the communication unit 901. If the check is wrong, the report indicating that the BL and/or EL check is wrong can be returned. In this example, the received data obtained by demodulation are the same with the transmitted data so the check result indicates correct, and after the transmitting apparatus receives the check report, the data transmission ends.

If LLR(C1C2*)<LLR(C3C4*), in this example, since C3C4* are in the BL, it is easy to demodulate C3C4* as 10 in the 16QAM+QPSK hierarchical modulation and it is believed that the reliability that C1C2* during the first transmission are correct is lower than the reliability that C3C4* during the retransmission are correct. The analyzing unit 905 may exchange the first two bits and the last two bits of the retransmitted data and sequence the retransmitted data from C3C4C1C2 to C1C2C3C4. The analyzing unit 905 finds all the constellation points with the last two bits of 10 on the first constellation map as the specific constellation points and there is one specific constellation point in each quadrant, translates the coordinate system and makes the coordinate origin at the center of the four specific constellation points of the four quadrants, shown as the dashed coordinate system in FIG. 11D, wherein the underlined constellation points are the specific constellation points with the last two bits of 10. If the position of the mapping point m of the sequenced retransmitted data on the translated coordinate system is closest to a specific constellation point, that specific constellation point is regarded as the transmitted data and in this example, the constellation point closest to the mapping point m is 0010. The users at the cell center may obtain C1C2 by analyzing the first constellation map according to C3C4* in the retransmitted data in order to constitute C1C2C3C4. The users at the cell border may obtain C1C2 by analyzing the first constellation map according to C3C4* in the retransmitted data. The analyzing unit 905 checks the sequenced retransmitted data, i.e. checks C1C2 and C3C4. The analyzing unit 905 may adopt the CRC method and returns a check report to the transmitting apparatus through the communication unit 901. If the check is wrong, the report indicating that the BL and/or EL check is wrong can be returned. In this example, the received data obtained by demodulation are the same with the transmitted data so the check result indicates correct, and after the transmitting apparatus receives the check report, the data transmission ends.

If the transmitting apparatus transmits the retransmitted data through the retransmitting unit 705 and the receiving apparatus only has BL data error, at this time, the determining unit 904 determines information in the control signaling of the retransmitted data and obtains that the data order of this retransmission is C3C4C1C2, and then it calls the analyzing unit 905.

The second case: the communication unit 701 of the transmitting apparatus receives the check report returned from the receiver and finds that there is only BL data error, i.e. only C1C2 error, and the retransmission counting unit 703 performs the retransmission counting and determines whether the retransmission times exceed the preset threshold (3 in this example) and if yes, the procedure ends; otherwise a check report is transmitted to the determining unit 704. The determining unit 704 determines that there is only BL data error according to the check report and calls the BL retransmitting unit 706, which modulates the data in the order of C1C2C3C4 with the second constellation map and transmits the data through the communication unit 701.

The communication units 901 of the receiving apparatuses of users at the cell center and at the cell border receive the data at the same time, determine whether to process or abandon the data according to their returned check reports and if the returned check report indicates that the receiving apparatus has received the data correctly, the retransmitted data are abandoned. If the returned check report indicates that there is only BL data error, the retransmission times determining unit 903 determines whether the retransmission times exceed the preset threshold (3 in this example) according to the information in the received data and if yes, the procedure ends; otherwise, the received data are transmitted to the determining unit 904. The determining unit 904 obtains from the retransmitted data that the data order is C1C2C3C4 and modulates the received data with the second constellation map and calls the BL analyzing unit 906. The BL analyzing unit 906 demodulates the data with the second constellation map and obtains the mapping point. As shown in FIG. 11E, the distance between the mapping point and the correct constellation point is a. Since the distance between the mapping point and the coordinate axis becomes larger, it is easy to demodulate C1C2 as 00 in the 16QAM+QPSK hierarchical modulation. The BL analyzing unit 906 checks the analyzed data with the CRC method, i.e. checks C1C2 and C3C4 and returns a check report to the transmitting apparatus through the communication unit 901. If the check is wrong, the report indicating that the BL and/or EL check is wrong can be returned. In this example, the received data obtained by demodulation are the same with the transmitted data so the check result indicates correct, and after the transmitting apparatus receives the check report, the data transmission ends.

The third case: the communication unit 701 of the transmitting apparatus receives the check report returned from the receiver and finds that there is only EL data error, i.e. only C3C4 error, and the retransmission counting unit 703 performs the retransmission counting and determines whether the retransmission times exceed the preset threshold (3 in this example) and if yes, the procedure ends; otherwise the check report is transmitted to the determining unit 704. The determining unit 704 determines that there is only EL data error according to the check report and transfers the EL retransmitting unit 707, which modulates the data in the order of C3C4C1C2 with the first constellation map and transmits the data through the communication unit 701.

The communication units 901 of the receiving apparatuses of users at the cell center and at the cell border receive the data at the same time, determine whether to process or abandon the data according to their returned check reports and if the returned check report indicates that the receiving apparatus has received the data correctly, the retransmitted data are abandoned. If the returned check report indicates that there is only EL data error, the retransmission times determining unit 903 determines whether the retransmission times exceed the preset threshold (3 in this example) according to the information in the received data and if yes, the procedure ends; otherwise, the received data are transmitted to the determining unit 904. The determining unit 904 obtains from the retransmitted data that the data order is C3C4C1C2 and modulates the received data with the first constellation map and calls the EL analyzing unit 907. The EL analyzing unit 907 demodulates the data with the first constellation map and obtains the mapping point. As shown in FIG. 11F, the distance between the mapping point and the correct constellation point is a. Since C3C4 are in the BL, it is easy to demodulate C3C4 as 10 in the 16QAM+QPSK hierarchical modulation. The EL analyzing unit 907 sequences the retransmitted data from C3C4C1C2 to C1C2C3C4, and checks the sequenced retransmitted data. The EL analyzing unit 907 may adopt the CRC method to check C1C2 in the BL and C3C4 in the EL and returns a check report to the transmitting apparatus through the communication unit 901. If the check is wrong, the report indicating that the BL and/or EL check is wrong can be returned. In this example, the received data obtained by demodulation are the same with the transmitted data so the check result indicates correct, and after the transmitting apparatus receives the check report, the data transmission ends.

Figure 12A:
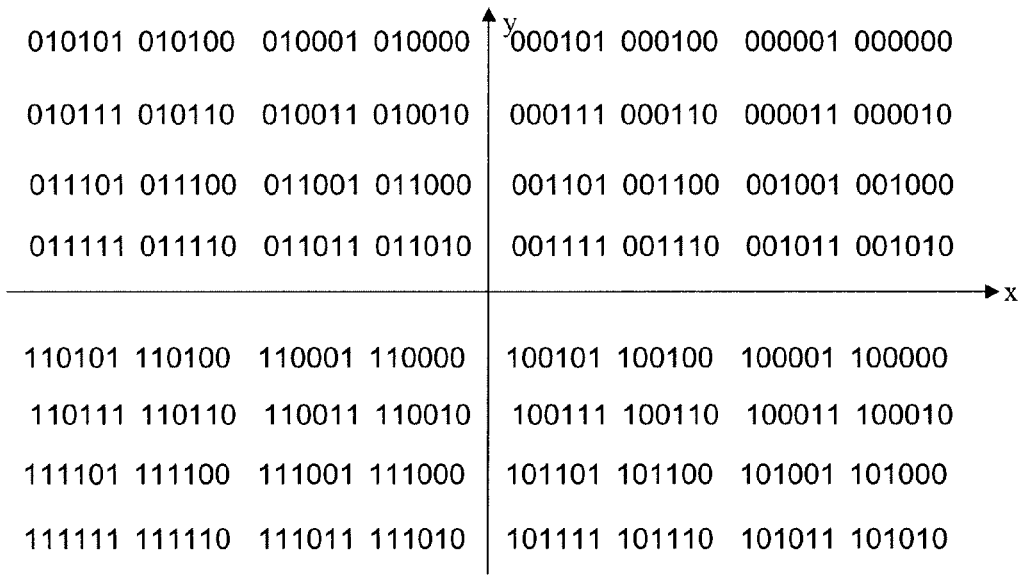
FIG. 12A is a diagram showing the first constellation map for the 16QAM+64QAM and the QPSK+64QAM hierarchical modulations according to a first embodiment of the present invention.
Figure 12B:
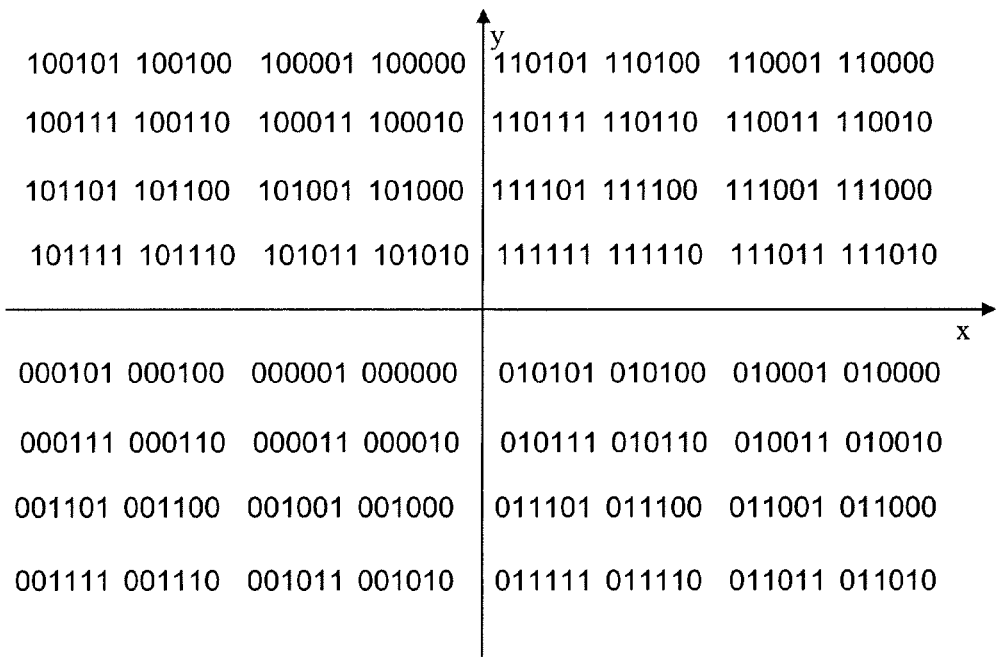
FIG. 12B is a diagram showing the second constellation map for the 16QAM+64QAM and the QPSK+64QAM hierarchical modulations according to the first embodiment of the present invention.

FIG. 12A is a diagram showing the first constellation map for the 16QAM+64QAM and the QPSK+64QAM hierarchical modulations according to the first embodiment of the present invention. FIG. 12B is a diagram showing the second constellation map for the 16QAM+64QAM and the QPSK+64QAM hierarchical modulations according to the first embodiment of the present invention.

Figure 12C:
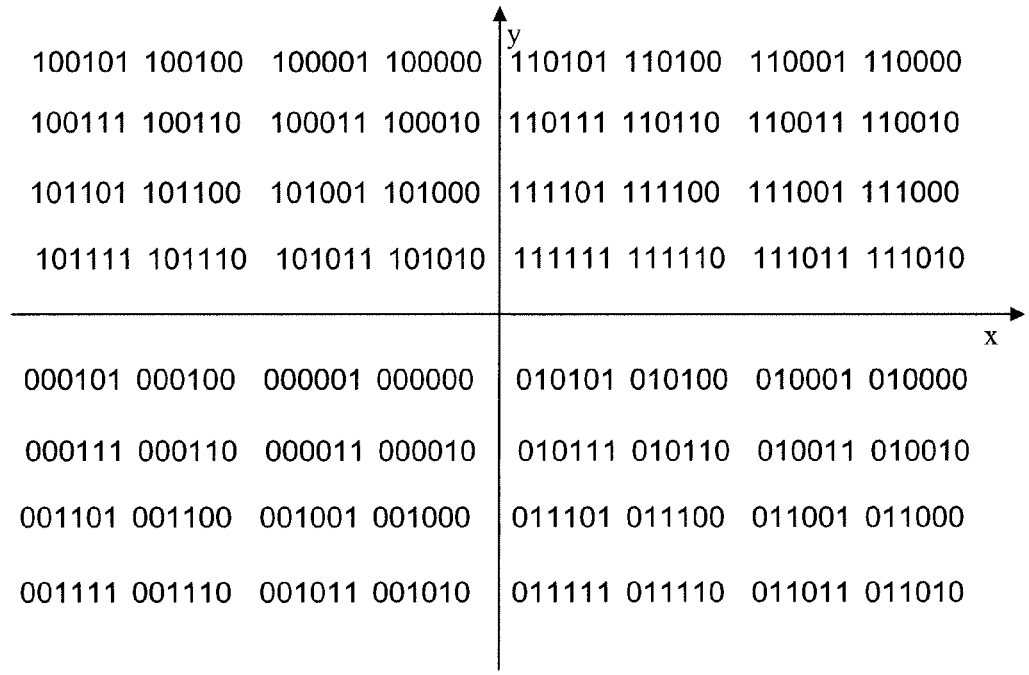
FIG. 12C shows the first constellation map for the 16QAM+64QAM and the QPSK+64QAM hierarchical modulations according to a second embodiment of the present invention.
Figure 12D:
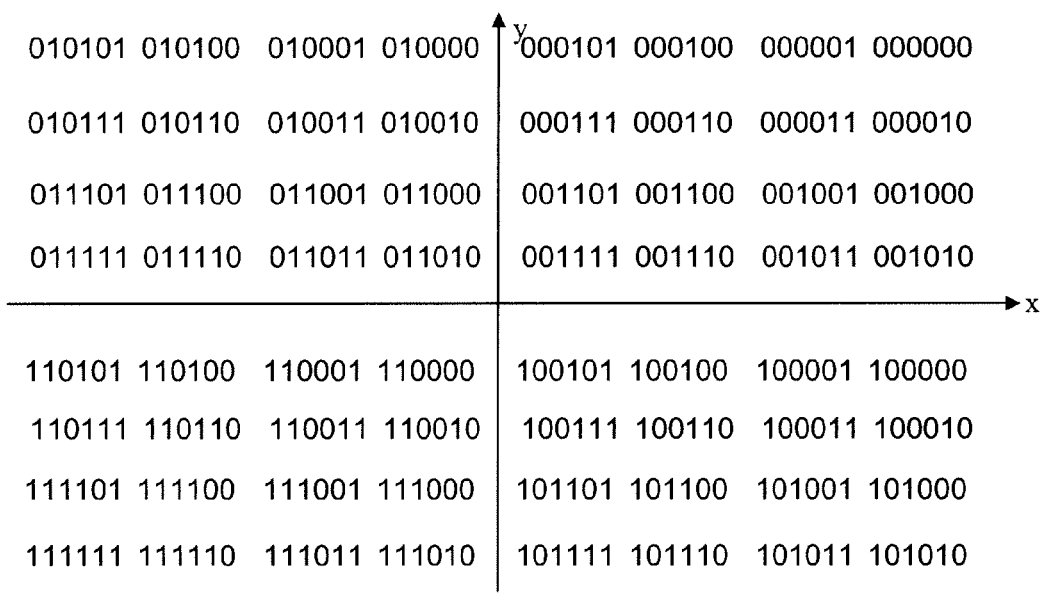
FIG. 12D shows the second constellation map for the 16QAM+64QAM and the QPSK+64QAM hierarchical modulations according to the second embodiment of the present invention.
Figure 12E:
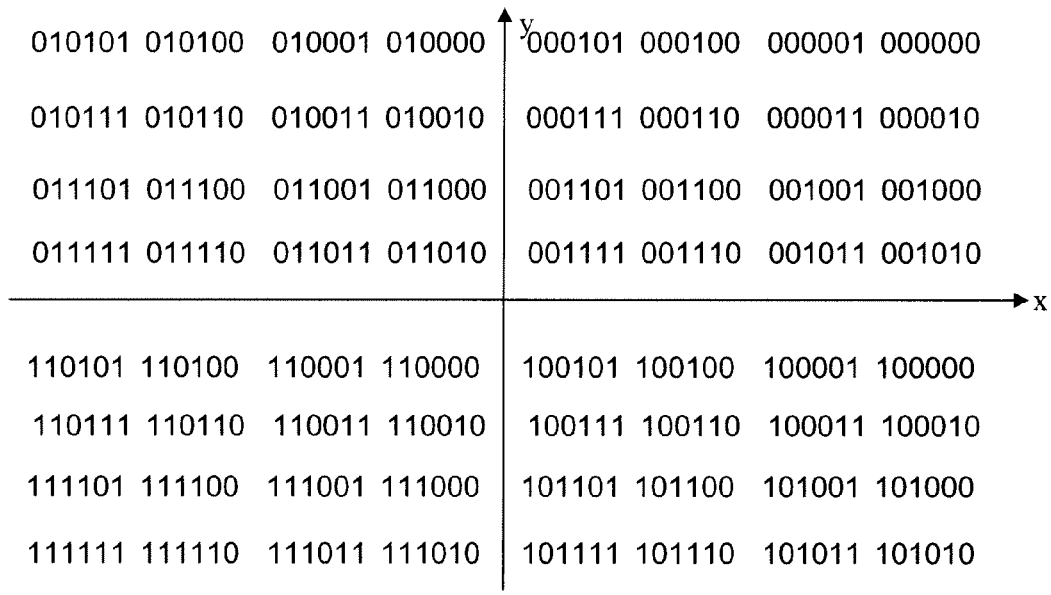
FIG. 12E shows the first constellation map for the 16QAM+64QAM and the QPSK+64QAM hierarchical modulations according to a third embodiment of the present invention.
Figure 12F:
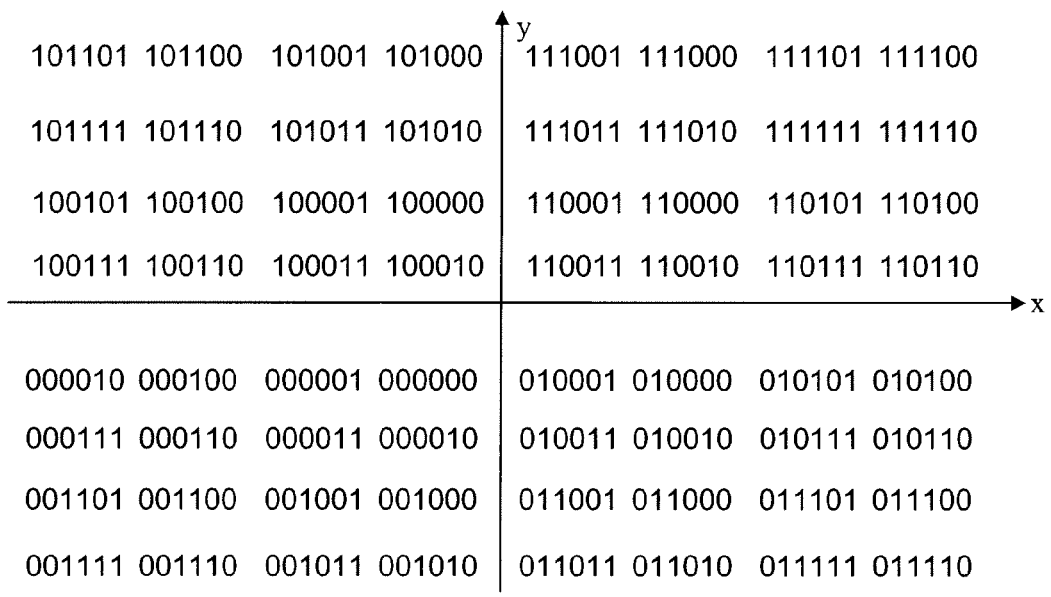
FIG. 12F shows the second constellation map for the 16QAM+64QAM and the QPSK+64QAM hierarchical modulations according to the third embodiment of the present invention.

Distances between constellation points with the same EL on the first constellation map and the second constellation map are better as large as possible and constellation points with the same last two bits on the first constellation map and the second constellation map are distributed evenly, i.e. every two intervened constellation points have the same last two bits so that the objective that the reliability of demodulation during the retransmission is improved by using a part of information obtained during demodulation is achieved. The constellation point mapped to the first constellation map by each demodulation symbol and the constellation point mapped to the second constellation map by exchanging the order of bits of the BL and EL included in the symbol have constellation hierarchical gains. As a preferred embodiment, on the first constellation map, constellation points in the first quadrant and those in the third quadrant are exchanged, and constellation points in the second quadrant and those in the fourth quadrant are exchanged. However, the present invention is not limited to the preferred embodiment. FIG. 12C shows the first constellation map for the 16QAM+64QAM and the QPSK+64QAM hierarchical modulations according to the second embodiment of the present invention. FIG. 12D shows the second constellation map for the 16QAM+64QAM and the QPSK+64QAM hierarchical modulations according to the second embodiment of the present invention. The first constellation map of the second embodiment is the same with the second constellation map of the first embodiment, and the second constellation map of the second embodiment is the same with the first constellation map of the first embodiment. FIG. 12E shows the first constellation map for the 16QAM+64QAM and the QPSK+64QAM hierarchical modulations according to the third embodiment of the present invention. FIG. 12F shows the second constellation map for the 16QAM+64QAM and the QPSK+64QAM hierarchical modulations according to the third embodiment of the present invention.

Figure 13A:
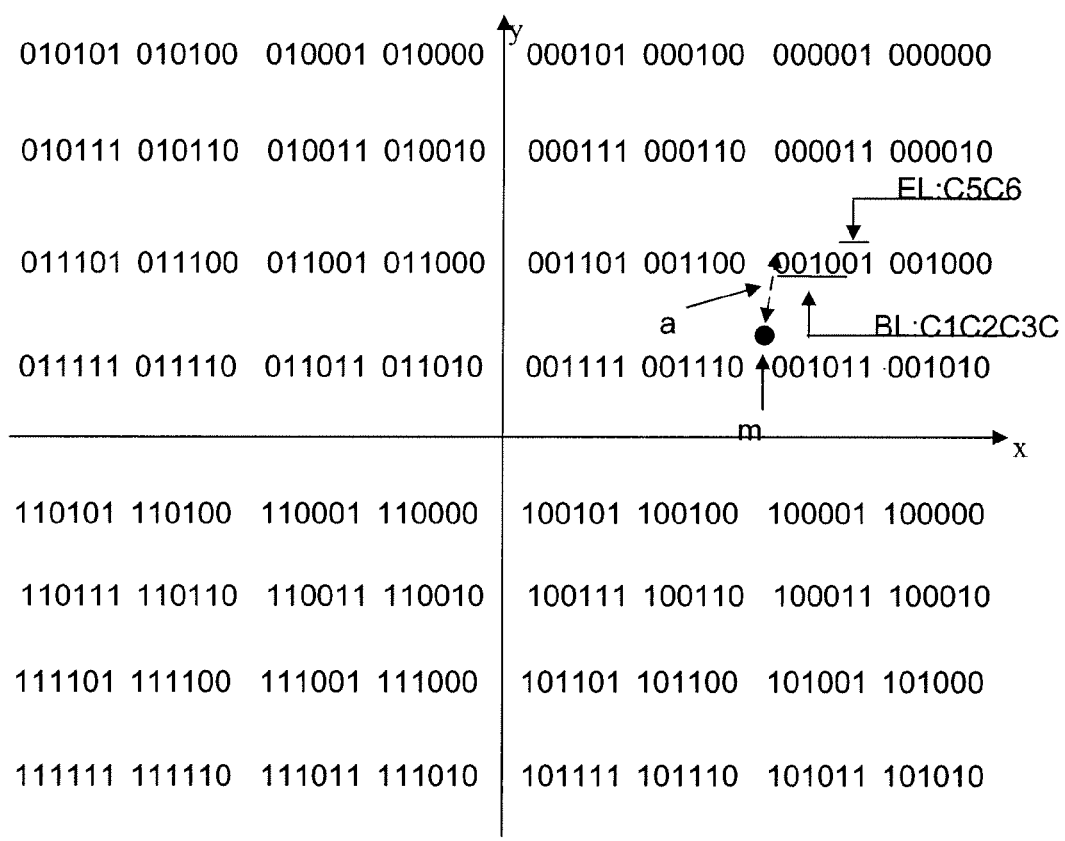
FIG. 13A is a schematic diagram showing that for the 16QAM+64QAM hierarchical modulation, the receiver maps the data received during the transmission step to the first constellation map of the first embodiment according to one embodiment of the present invention.
Figure 13B:
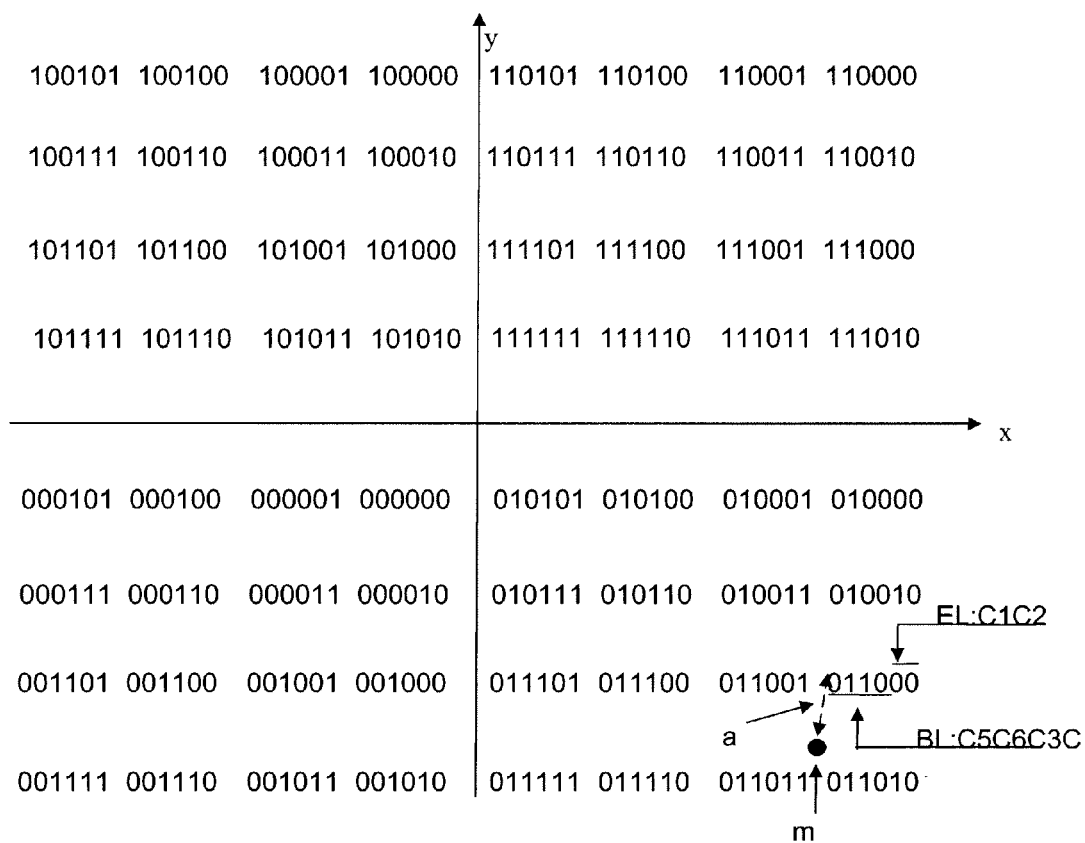
FIG. 13B is a schematic diagram showing that for the 16QAM+64QAM hierarchical modulation, the receiver maps the data received when there are both BL and EL data errors to the second constellation map of the first embodiment according to one embodiment of the present invention.
Figure 13C:
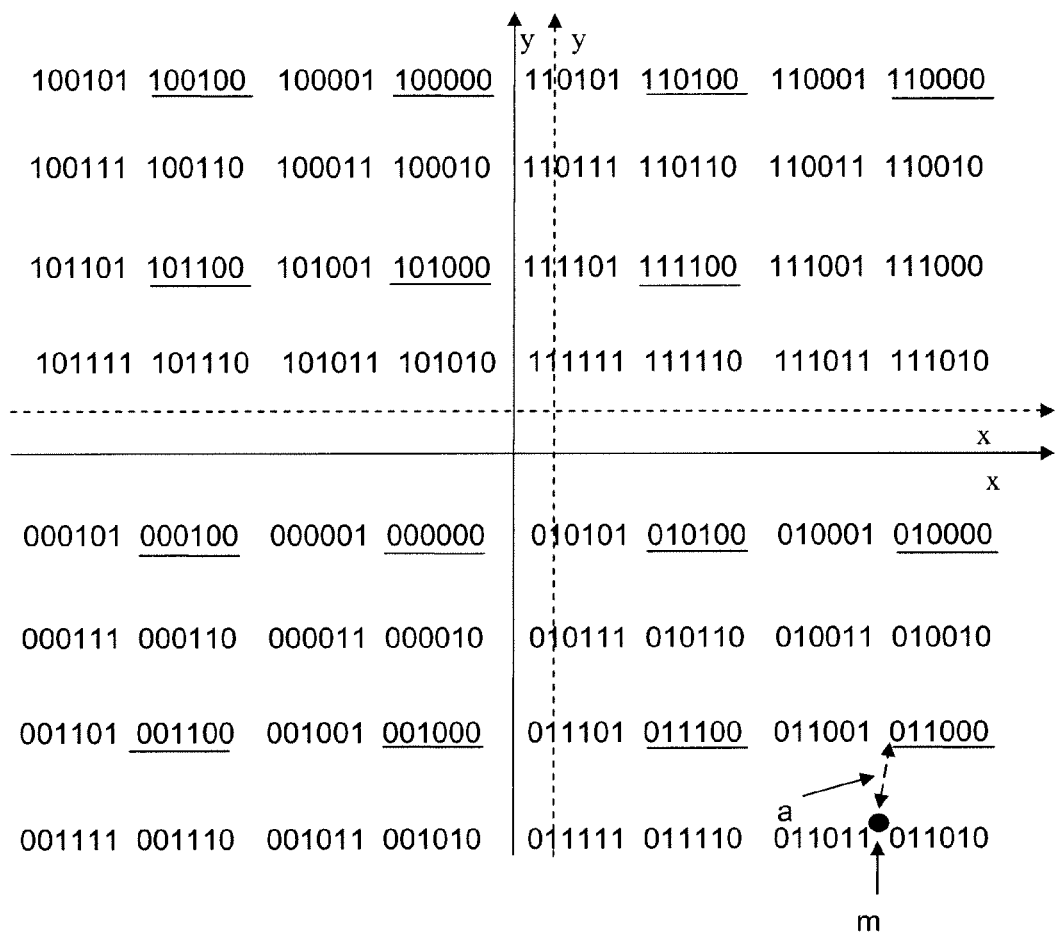
FIG. 13C is a schematic diagram showing that for the 16QAM+64QAM hierarchical modulation, the receiver maps the data received to the second constellation map of the first embodiment and then translates the coordinate system according to one embodiment of the present invention.
Figure 13D:
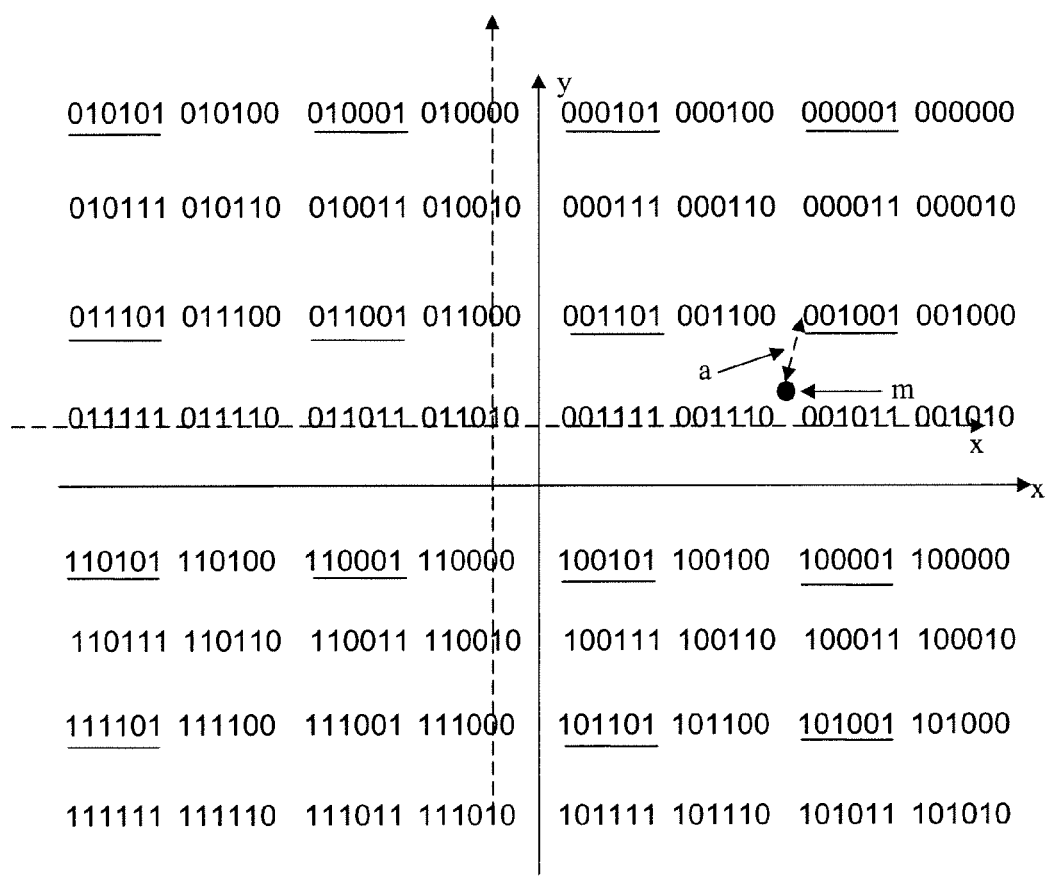
FIG. 13D is a schematic diagram showing that for the 16QAM+64QAM hierarchical modulation, the receiver maps the data received to the first constellation map of the first embodiment and then translates the coordinate system according to one embodiment of the present invention.
Figure 13E:
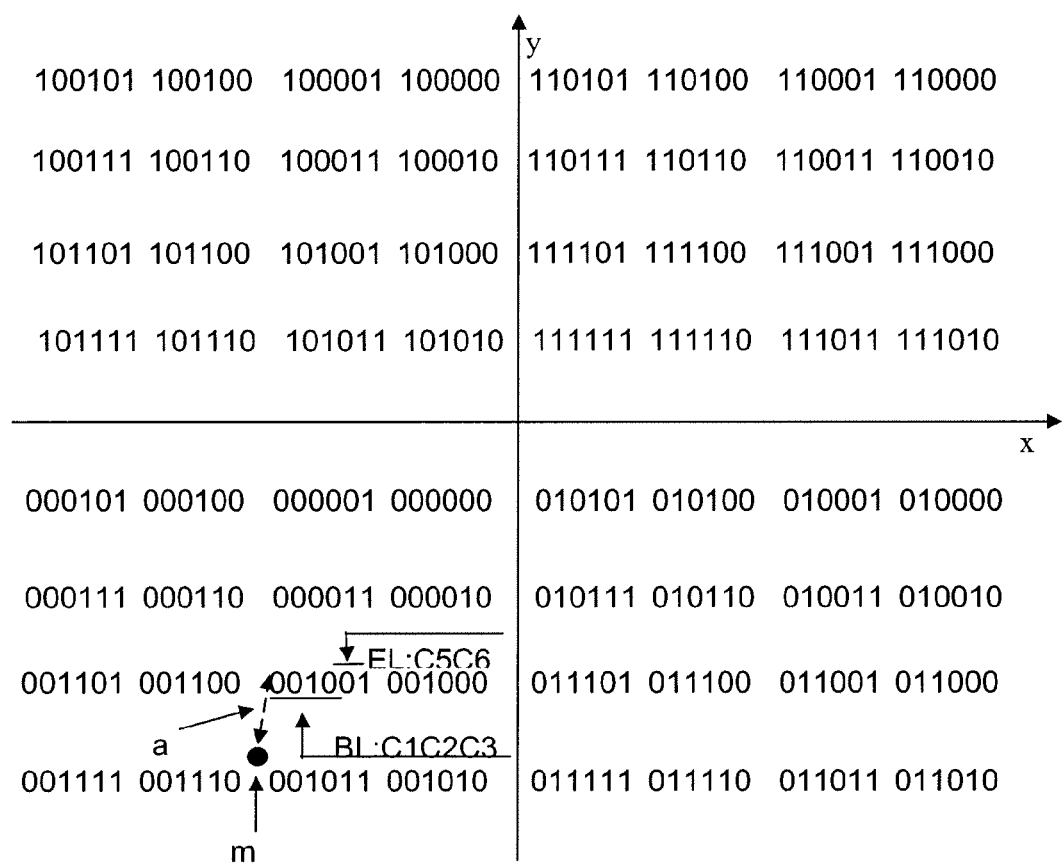
FIG. 13E is a schematic diagram showing that for the 16QAM+64QAM hierarchical modulation, the receiver maps the data received during the retransmission step when there is only BL data error to the second constellation map of the first embodiment according to one embodiment of the present invention.
Figure 13F:
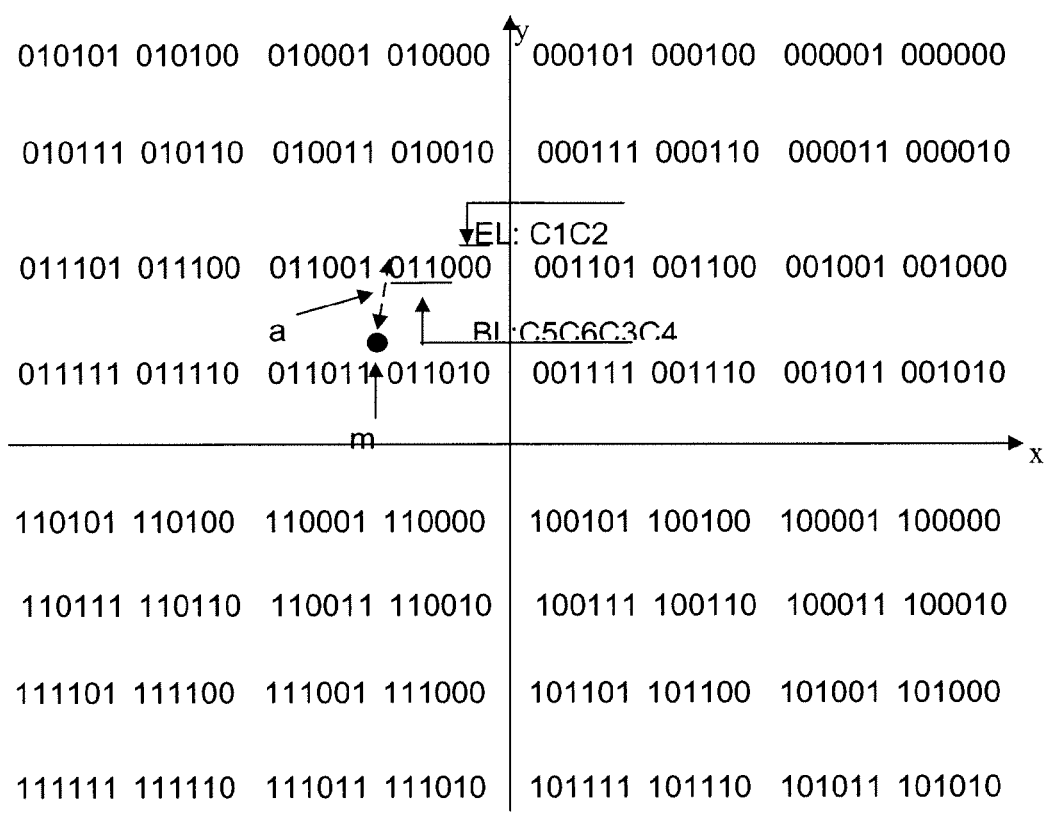
FIG. 13F is a schematic diagram showing that for the 16QAM+64QAM hierarchical modulation, the receiver maps the data received during the retransmission step when there is only EL data error to the first constellation map of the first embodiment according to one embodiment of the present invention.

FIG. 13A is a schematic diagram showing that for the 16QAM+64QAM hierarchical modulation, the receiver maps the data received during the transmitting step to the first constellation map of the first embodiment according to one embodiment of the present invention. FIG. 13B is a schematic diagram showing that for the 16QAM+64QAM hierarchical modulation, the receiver maps the data received when there are both BL and EL data errors to the second constellation map of the first embodiment according to one embodiment of the present invention. FIG. 13C is a schematic diagram showing that for the 16QAM+64QAM hierarchical modulation, the receiver maps the data received to the second constellation map of the first embodiment and then translates the coordinate system according to one embodiment of the present invention. FIG. 13D is a schematic diagram showing that for the 16QAM+64QAM hierarchical modulation, the receiver maps the data received to the first constellation map of the first embodiment and then translates the coordinate system according to one embodiment of the present invention. FIG. 13E is a schematic diagram showing that for the 16QAM+64QAM hierarchical modulation, the receiver maps the data received during the retransmission step when there is only BL data error to the second constellation map of the first embodiment according to one embodiment of the present invention. FIG. 13F is a schematic diagram showing that for the 16QAM+64QAM hierarchical modulation, the receiver maps the data received during the retransmission step when there is only EL data error to the first constellation map of the first embodiment according to one embodiment of the present invention.

Herein, m is a mapping point which is obtained by mapping the data received by the receiver to the constellation map, and a is a distance between the constellation point and the mapping point. As commonly known in the art, the farer the mapping point is with respect to the coordinate axis, the more correct the demodulation is.

In this example, the data to be transmitted by the transmitting apparatus is 001001, wherein the BL (C1C2C3C4) is 0010 and the EL (C5C6) is 01. Since this is the first transmission of the transmitting unit 702 of the transmitting apparatus, it modulates data 001001 with the first constellation map in the order of C1C2C3C4C5C6 and transmits the modulated data to the communication unit 701 for further transmission.

The receiving apparatuses of users at the cell center and at the cell border receive data through the communication unit 901, obtain that this is the first transmission according to information in the data and then transmit the data to the receiving unit 902. The receiving unit 902 demodulates the data with the first constellation map according to the information in the data. Because of the interference or signal quality, the position of the demodulated data mapped to the first constellation map is shown in FIG. 13A and in this example, the receiving apparatuses of users at the cell center with a high SNR and of users at the cell border with a low SNR receive the data and the distance between the mapping point m of the received data and the constellation point 001001 is a. The receiving unit 902 demodulates and checks the data and returns a check result to the transmitting apparatus through the communication unit 901.

The first case: the communication unit 701 of the transmitting apparatus receives the check report returned from the receiver and finds that there are both BL and EL data errors, i.e. BL C1C2C3C4 error and EL C5C6 error, and the retransmission counting unit 703 performs the retransmission counting and determines whether the retransmission times exceed the preset threshold (3 in this example) and if yes, the procedure ends; otherwise the check report is transmitted to the determining unit 704. The determining unit 704 determines that there are both BL and EL data errors according to the check report and calls the retransmitting unit 705, which exchanges the last two bits (C5C6: 01) of the data 001001 and the first two bits (00) of the BL (C1C2C3C4: 0010) to constitute C5C6C3C4C1C2: 011000, modulates the data with the second constellation map and transmits the data through the communication unit 701.

The communication units 901 of the receiving apparatuses of users at the cell center and at the cell border receive the retransmitted data at the same time, determine whether to process or abandon the data according to their returned check reports and if the returned check report indicates that the receiving apparatus has received the data correctly, the retransmitted data are abandoned. If the returned check report indicates that there are both BL and EL data errors, the retransmission times determining unit 903 determines whether the retransmission times exceed the preset threshold (3 in this example) according to information in the received data and if yes, the procedure ends; if this is the first transmission, the received data are transmitted to the determining unit 904. The determining unit 904 obtains that the data order of this transmission is C5C6C3C4C1C2 according to the information in the received data and modulates the received data with the second constellation map and calls the analyzing unit 905. The analyzing unit 905 demodulates the retransmitted data with the second constellation map and obtains the mapping point of the retransmitted data. As shown in FIG. 13B, the distance between the mapping point and the correct constellation point is a.

The analyzing unit 905 may perform the following steps. Since C5C6 are in the BL, it is easy to demodulate C5C6 as 01 in the 16QAM+64QAM hierarchical modulation. The analyzing unit 905 exchanges the last two bits of the EL and the first two bits of the BL of the retransmitted data and sequences the retransmitted data from C5C6C3C4C1C2 to C1C2C3C4C5C6. The analyzing unit 905 finds all the constellation points with the last two bits of 01 on the first constellation map as the specific constellation points and there are four specific constellation points in each quadrant, translates the coordinate system and makes the coordinate origin at the center of the sixteen specific constellation points of the four quadrants, shown as the dashed coordinate system in FIG. 13D, wherein the underlined constellation points are the specific constellation points with the last two bits of 01. If the position of the mapping point m on the translated coordinate system is closest to a specific constellation point, that specific constellation point is regarded as the transmitted data and in this example, the constellation point closest to the mapping point m is 001001. The users at the cell center may obtain C1C2C3C4 by analyzing the first constellation map according to C5C6 in the retransmitted data. The users at the cell border may obtain C1C2C3C4 according to the above first constellation map analysis. The analyzing unit 905 checks the sequenced retransmitted data, i.e. checks C1C2C3C4 and C5C6. The analyzing unit 905 may adopt the CRC method and returns a check report to the transmitting apparatus through the communication unit 901. If the check is wrong, the report indicating that the BL and/or EL check is wrong can be returned. In this example, the received data obtained by demodulation are the same with the transmitted data so the check result indicates correct, and after the transmitting apparatus receives the check report, the data transmission ends.

The analyzing unit 905 may further perform the following steps. The C1C2* are demodulated during the first transmission and the C5C6* are demodulated during the retransmission. If $LLR(C1C2^*) \geq LLR(C5C6^*)$, it is believed that the reliability that C1C2* during the first transmission are correct is higher than the reliability that C5C6* during the retransmission are correct. The analyzing unit 905 finds all the constellation points with the last two bits of 00 on the second constellation map as the specific constellation points and there are four specific constellation points in each quadrant, translates the coordinate system and makes the coordinate origin at the center of the sixteen specific constellation points of the four quadrants, shown as the dashed coordinate system in FIG. 13C, wherein the underlined constellation points are the specific constellation points with the last two bits of 00. If the position of the mapping point m of the retransmitted data on the translated coordinate system is closest to a specific constellation point, that specific constellation point is regarded as the transmitted data and in this example, the constellation point closest to the mapping point m is 011000 (C5C6C3C4C1C2). The users at the cell center may obtain C3C4C5C6 by analyzing the second constellation map according to C1C2* in the first transmission. The users at the cell border may obtain C1C2C3C4 according to the above second constellation map analysis. The analyzing unit 905 sequences the retransmitted data from C5C6C3C4C1C2 into C1C2C3C4C5C6, checks the sequenced retransmitted data, i.e. checks C1C2C3C4 and C5C6. The analyzing unit 905 may adopt the CRC method and returns a check report to the transmitting apparatus through the communication unit 901. If the check is wrong, the report indicating that the BL and/or EL check is wrong can be returned. In this example, the received data obtained by demodulation are the same with the transmitted data so the check result indicates correct, and after the transmitting apparatus receives the check report, the data transmission ends.

If $LLR(C1C2^*)<LLR(C5C6^*)$, it is believed that the reliability that C1C2 during the first transmission are correct is lower than the reliability that C5C6 during the retransmission are correct. In this example, since C5C6* are in the BL, it is easy to demodulate C5C6* as 01 in the 16QAM+64QAM hierarchical modulation. The analyzing unit 905 exchanges the last two bits of the EL and the first two bits of the BL of the retransmitted data and sequence the retransmitted data from C5C6C3C4C1C2 to C1C2C3C4C5C6. The analyzing unit 905 finds all the constellation points with the last two bits of 01 on the first constellation map as the specific constellation points and there are four specific constellation points in each quadrant, translates the coordinate system and makes the coordinate origin at the center of the sixteen specific constellation points of the four quadrants, shown as the dashed coordinate system in FIG. 13D, wherein the underlined constellation points are the specific constellation points with the last two bits of 01. If the position of the mapping point m on the translated coordinate system is closest to a specific constellation point, that specific constellation point is regarded as the transmitted data and in this example, the constellation point closest to the mapping point m is 001001. The users at the cell center may obtain C1C2C3C4 by analyzing the first constellation map according to C5C6* in the retransmitted data. The users at the cell border may obtain C1C2C3C4 according to the above first constellation map analysis. The analyzing unit 905 checks the sequenced retransmitted data, i.e. checks C1C2C3C4 and C5C6. The analyzing unit 905 may adopt the CRC method and returns a check report to the transmitting apparatus through the communication unit 901. If the check is wrong, the report indicating that the BL and/or EL check is wrong can be returned. In this example, the received data obtained by demodulation are the same with the transmitted data so the check result indicates correct, and after the transmitting apparatus receives the check report, the data transmission ends.

If the transmitting apparatus transmits the retransmitted data through the retransmitting unit 705 and the receiving apparatus only has BL data error, at this time, the determining unit 904 determines information in the control signaling of the retransmitted data and obtains that the data order of this retransmission is C5C6C3C4C1C2, and then it calls the analyzing unit 905.

The second case: the communication unit 701 of the transmitting apparatus receives the check report returned from the receiver and finds that there is only BL data error, i.e. only C1C2C3C4 error, and the retransmission counting unit 703 performs the retransmission counting and determines whether the retransmission times exceed the preset threshold (3 in this example) and if yes, the procedure ends; otherwise the check report is transmitted to the determining unit 704. The determining unit 704 determines that there is only BL data error according to the check report and transfers the BL retransmitting unit 706, which modulates the data in the order of C1C2C3C4C5C6 with the second constellation map and transmits the data through the communication unit 701.

The communication units 901 of the receiving apparatuses of users at the cell center and at the cell border receive the retransmitted data at the same time, determine whether to process or abandon the data according to their returned check reports and if the returned check report indicates that the receiving apparatus has received the data correctly, the retransmitted data are abandoned. If the returned check report indicates that there is only BL data error, the retransmission times determining unit 903 determines whether the retransmission times exceed the preset threshold (3 in this example) according to information in the received data and if yes, the procedure ends; otherwise, the received data are transmitted to the determining unit 904. The determining unit 904 obtains from the retransmitted data that the data order is C1C2C3C4C5C6 and modulates the received data with the second constellation map and calls the BL analyzing unit 906. The BL analyzing unit 906 demodulates the data with the second constellation map and obtains the mapping point. As shown in FIG. 13E, the distance between the mapping point and the correct constellation point is a. Since the distance between the mapping point and the coordinate axis becomes larger, it is easy to demodulate C1C2C3C4 as 0010 in the 16QAM+64QAM hierarchical modulation. The BL analyzing unit 906 checks the analyzed data with the CRC method, i.e. checks C1C2C3C4 of the BL and C5C6 of the EL and returns a check report to the transmitting apparatus through the communication unit 901. If the check is wrong, the report indicating that the BL and/or EL check is wrong can be returned. In this example, the received data obtained by demodulation are the same with the transmitted data so the check result indicates correct, and after the transmitting apparatus receives the check report, the data transmission ends.

The third case: the communication unit 701 of the transmitting apparatus receives the check report returned from the receiver and finds that there is only EL data error, i.e. only C5C6 error, and the retransmission counting unit 703 performs the retransmission counting and determines whether the retransmission times exceed the preset threshold (3 in this example) and if yes, the procedure ends; otherwise the check report is transmitted to the determining unit 704. The determining unit 704 determines that there is only EL data error according to the check report and calls the EL retransmitting unit 707, which modulates the data in the order of C5C6C3C4C1C2 with the first constellation map and transmits the data through the communication unit 701.

The communication units 901 of the receiving apparatuses of users at the cell center and at the cell border receive the retransmitted data at the same time, determine whether to process or abandon the data according to their returned check reports and if the returned check report indicates that the receiving apparatus has received the data correctly, the retransmitted data are abandoned. If the returned check report indicates that there is only EL data error, the retransmission times determining unit 903 determines whether the retransmission times exceed the preset threshold (3 in this example) according to information in the received data and if yes, the procedure ends; otherwise, the received data are transmitted to the determining unit 904. The determining unit 904 obtains from the retransmitted data that the data order is C5C6C3C4C1C2 and modulates the received data with the first constellation map and calls the EL analyzing unit 907. The EL analyzing unit 907 demodulates the data with the first constellation map and obtains the mapping point of the retransmitted data. As shown in FIG. 13F, the distance between the mapping point and the correct constellation point is a. Since C5C6 are in the BL, it is easy to demodulate C5C6 as 01 in the 16QAM+64QAM hierarchical modulation. The EL analyzing unit 907 sequences the retransmitted data from C5C6C3C4C1C2 to C1C2C3C4C5C6, and then it checks the sequenced retransmitted data. The EL analyzing unit 907 may adopt the CRC method to check C1C2C3C4 in the BL and C5C6 in the EL and returns a check report to the transmitting apparatus through the communication unit 901. If the check is wrong, the report indicating that the BL and/or EL check is wrong can be returned. In this example, the received data obtained by demodulation are the same with the transmitted data so the check result indicates correct, and after the transmitting apparatus receives the check report, the data transmission ends.

Figure 14A:
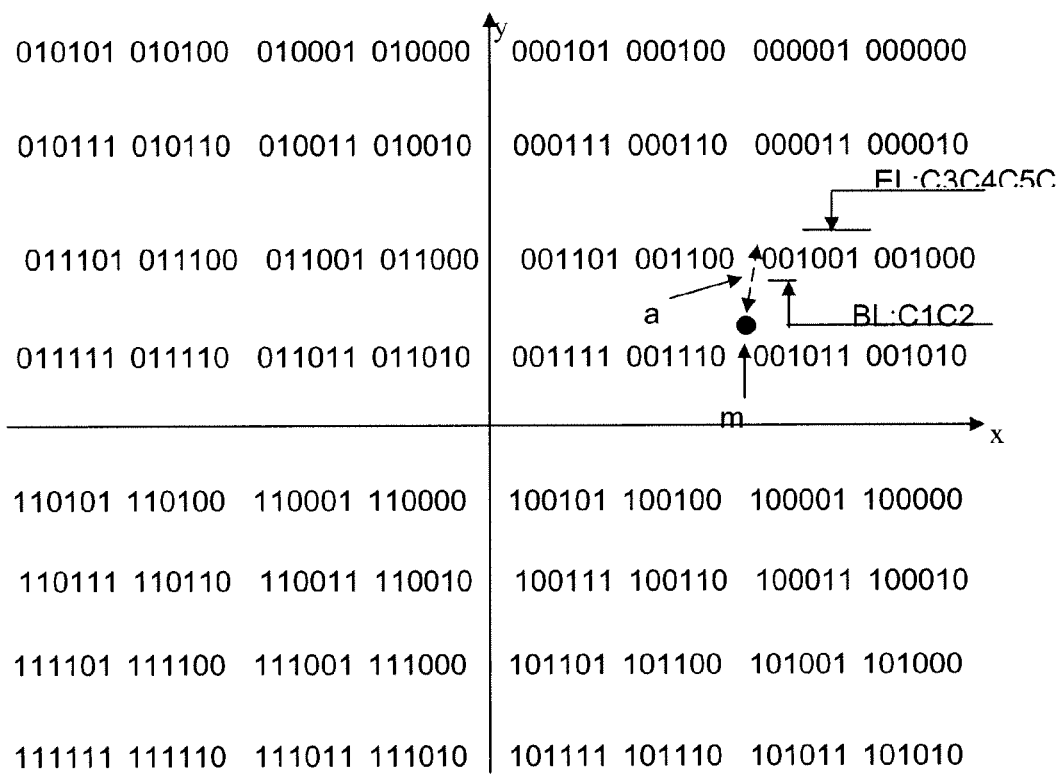
FIG. 14A is a schematic diagram showing that for the QPSK+64QAM hierarchical modulation, the receiver maps the data received during the transmission step to the first constellation map of the first embodiment according to one embodiment of the present invention.
Figure 14B:
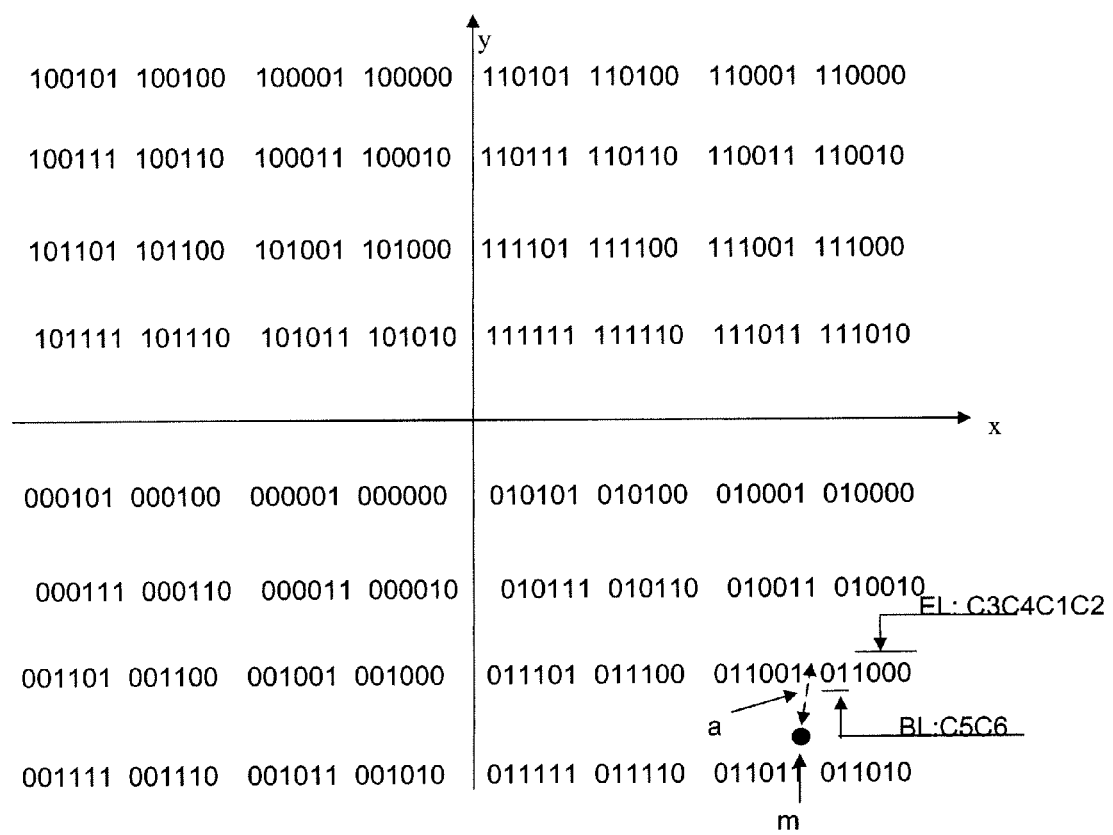
FIG. 14B is a schematic diagram showing that for the QPSK+64QAM hierarchical modulation, the receiver maps the data received when both BL and EL data are error to the second constellation map of the first embodiment according to one embodiment of the present invention.
Figure 14C:
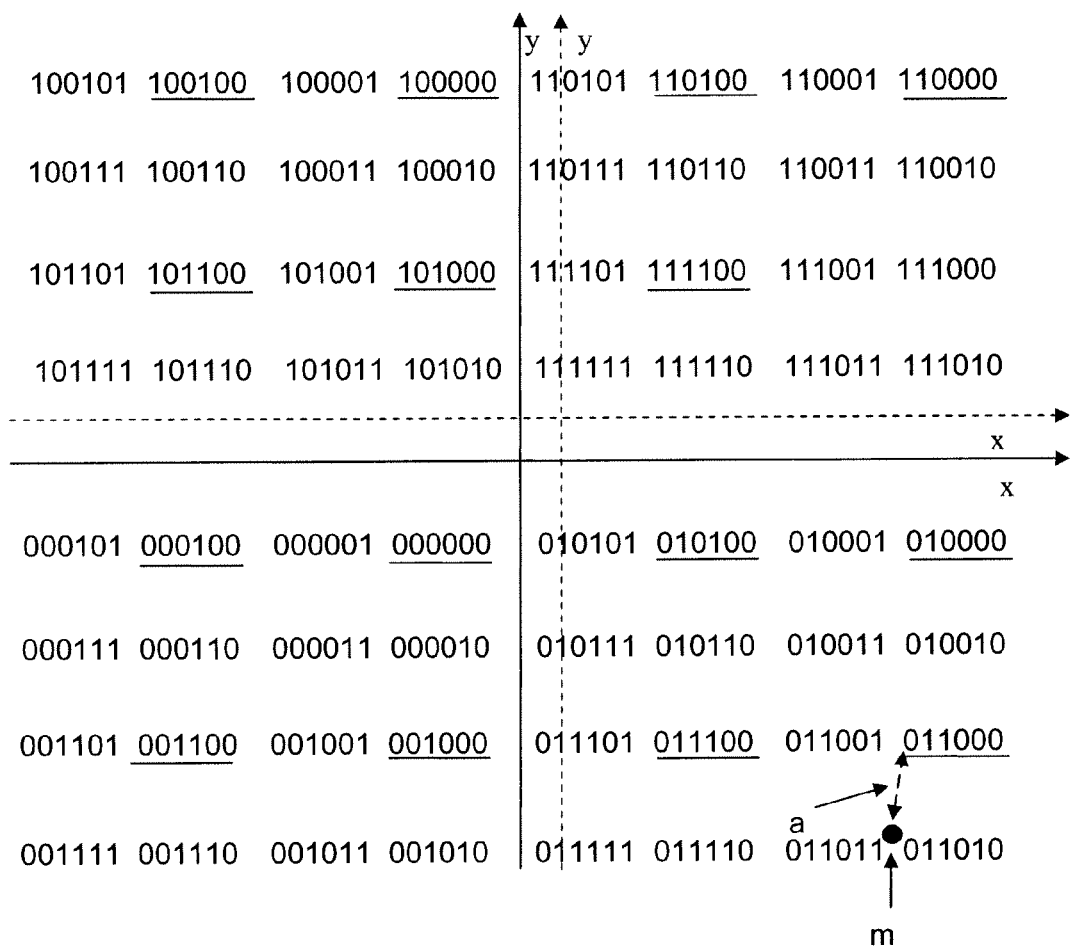
FIG. 14C is a schematic diagram showing that for the QPSK+64QAM hierarchical modulation, the receiver maps the data received to the second constellation map of the first embodiment and then translates the coordinate system according to one embodiment of the present invention.
Figure 14D:
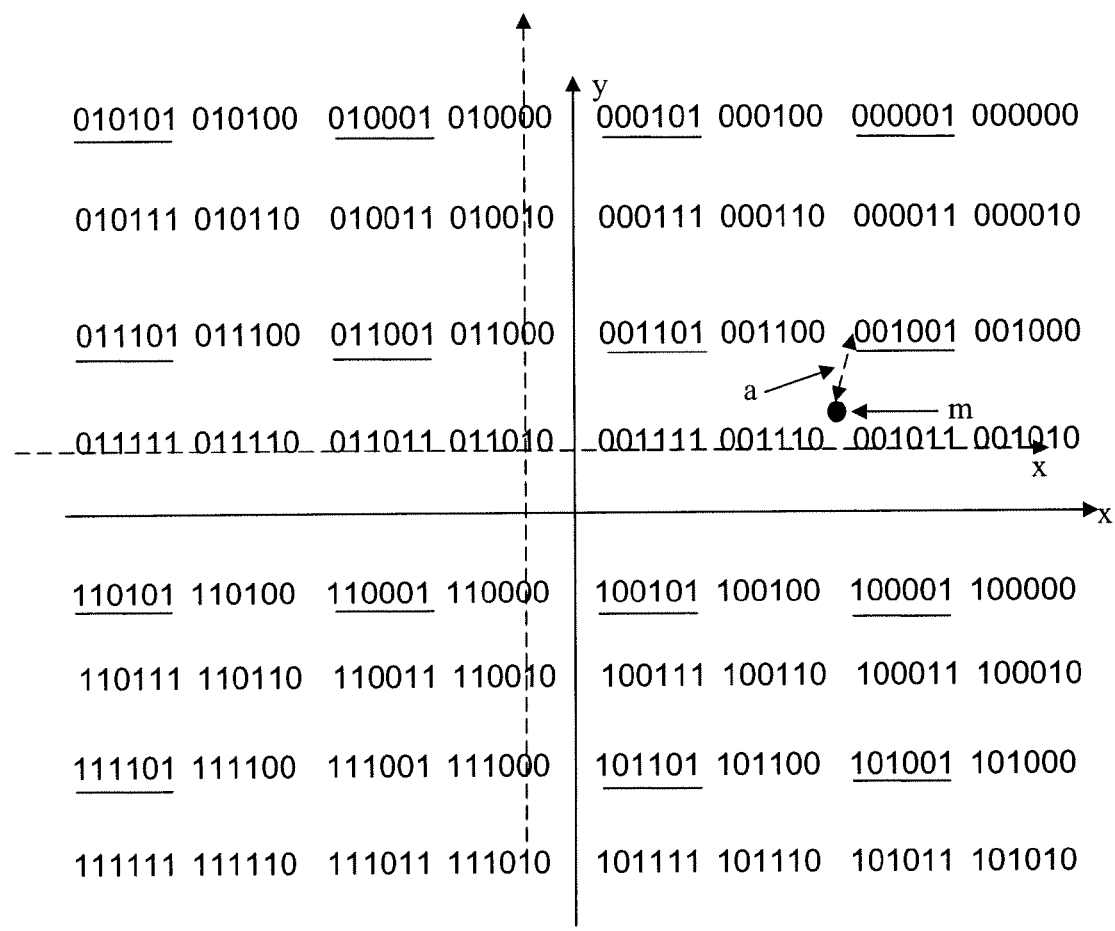
FIG. 14D is a schematic diagram showing that for the QPSK+64QAM hierarchical modulation, the receiver maps the data received to the first constellation map of the first embodiment and then translates the coordinate system according to one embodiment of the present invention.
Figure 14E:
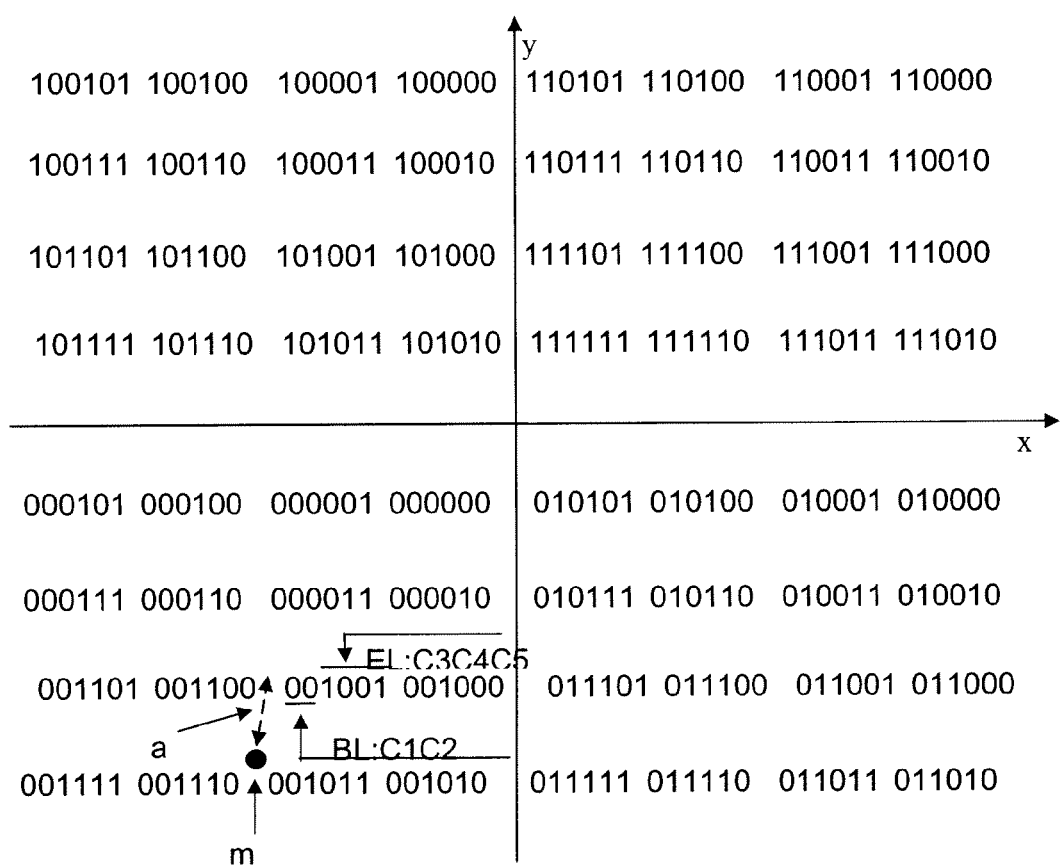
FIG. 14E is a schematic diagram showing that for the QPSK+64QAM hierarchical modulation, the receiver maps the data received during the retransmission step when there is only BL data error to the second constellation map of the first embodiment according to one embodiment of the present invention.
Figure 14F:
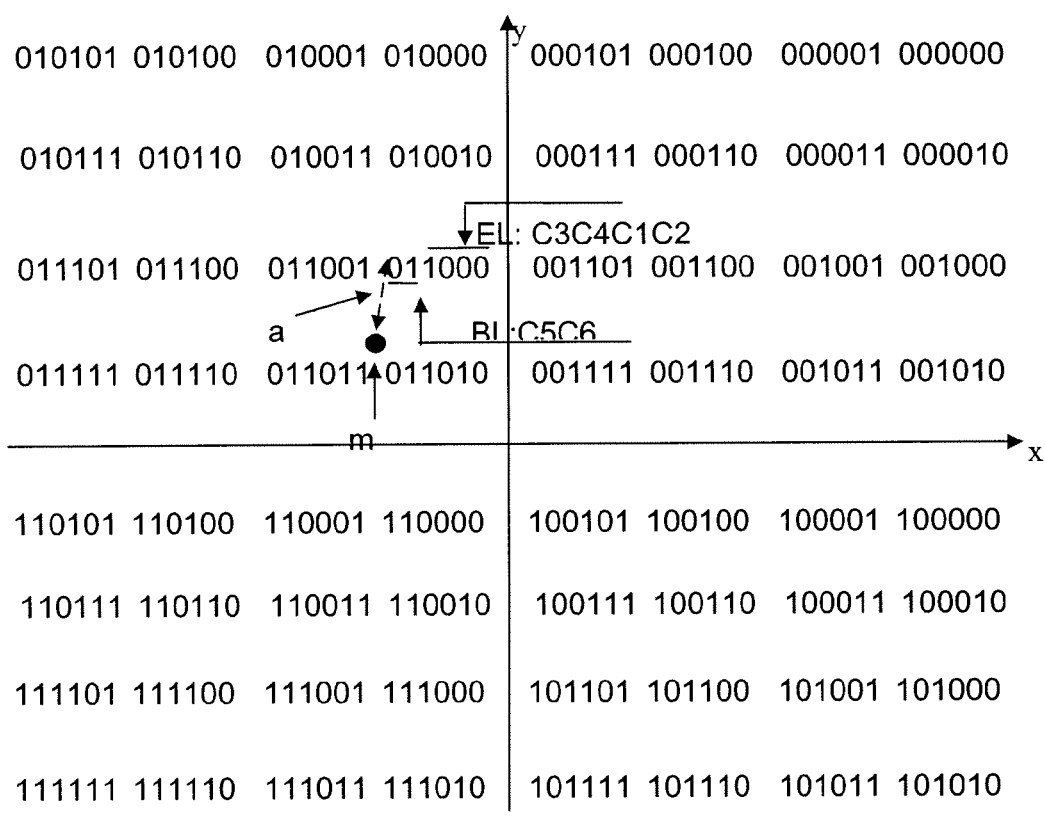
FIG. 14F is a schematic diagram showing that for the QPSK+64QAM hierarchical modulation, the receiver maps the data received during the retransmission step when there is only EL data error to the first constellation map of the first embodiment according to one embodiment of the present invention.

FIG. 14A is a schematic diagram showing that for the QPSK+64QAM hierarchical modulation, the receiver maps data received during the transmitting step to the first constellation map of the first embodiment according to one embodiment of the present invention. FIG. 14B is a schematic diagram showing that for the QPSK+64QAM hierarchical modulation, the receiver maps data received when there are both BL and EL data errors to the second constellation map of the first embodiment according to one embodiment of the present invention. FIG. 14C is a schematic diagram showing that for the QPSK+64QAM hierarchical modulation, the receiver maps data received to the second constellation map of the first embodiment and then translates the coordinate system according to one embodiment of the present invention. FIG. 14D is a schematic diagram showing that for the QPSK+64QAM hierarchical modulation, the receiver maps data received to the first constellation map of the first embodiment and then translates the coordinate system according to one embodiment of the present invention. FIG. 14E is a schematic diagram showing that for the QPSK+64QAM hierarchical modulation, the receiver maps data received during the retransmission step when there is only BL data error to the second constellation map of the first embodiment according to one embodiment of the present invention. FIG. 14F is a schematic diagram showing that for the QPSK+64QAM hierarchical modulation, the receiver maps data received during the retransmission step when there is only EL data error to the first constellation map of the first embodiment according to one embodiment of the present invention.

Herein, m is a mapping point which is obtained by mapping the data received by the receiver to the constellation map, and a is a distance between the constellation point and the mapping point. As commonly known in the art, the farer the mapping point is with respect to the coordinate axis, the more correct the demodulation is.

In this example, the data to be transmitted by the transmitting apparatus is 001001, wherein the BL (C1C2) is 00 and the EL (C3C4C5C6) is 1001. Since this is the first transmission of the transmitting unit 702 of the transmitting apparatus, it modulates data 001001 with the first constellation map in the order of C1C2C3C4C5C6 and transmits the modulated data to the communication unit 701 for further transmission.

The receiving apparatuses of users at the cell center and at the cell border receive data through the communication unit 901, obtain that this is the first transmission according to information in the data and then transmit the data to the receiving unit 902. The receiving unit 902 demodulates the data with the first constellation map according to the information in the data. Because of the interference or signal quality, the position of the demodulated data mapped to the first constellation map is shown in FIG. 14A and in this example, the receiving apparatuses of users at the cell center with a high SNR and of users at the cell border with a low SNR receive the data and the distance between the mapping point m of the received data and the constellation point 001001 is a. The receiving unit 902 demodulates and checks the data and returns a check result to the transmitting apparatus through the communication unit 901.

The first case: the communication unit 701 of the transmitting apparatus receives the check report returned from the receiver and finds that there are both BL and EL data errors, i.e. BL C1C2 error and EL C3C4C5C6 error, and the retransmission counting unit 703 performs the retransmission counting and determines whether the retransmission times exceed the preset threshold (3 in this example) and if yes, the procedure ends; otherwise the check report is transmitted to the determining unit 704. The determining unit 704 determines that there are both BL and EL data errors according to the check report and calls the retransmitting unit 705, which exchanges the last two bits (C5C6: 01) of the data 001001 and the first two bits of the BL (C1C2: 00) to constitute C5C6C3C4C1C2: 011000, modulates the data with the second constellation map and transmits the data through the communication unit 701.

The communication units 901 of the receiving apparatuses of users at the cell center and at the cell border receive the data at the same time, determine whether to process or abandon the data according to their returned check reports and if the returned check report indicates that the receiving apparatus has received the data correctly, the retransmitted data are abandoned. If the returned check report indicates that there are both BL and EL data errors, the retransmission times determining unit 903 determines whether the retransmission times exceed the preset threshold (3 in this example) according to information in the received data and if yes, the procedure ends; if this is the first transmission, the received data are transmitted to the determining unit 904. The determining unit 904 obtains that the data order of this transmission is C5C6C3C4C1C2 according to the information in the retransmitted data and modulates the received data with the second constellation map and calls the analyzing unit 905. The analyzing unit 905 demodulates the retransmitted data with the second constellation map and obtains the mapping point. As shown in FIG. 14B, the distance between the mapping point and the correct constellation point is a.

The analyzing unit 905 may perform the following steps. Since C5C6 are in the BL, it is easy to demodulate C5C6 as 01 in the QPSK+64QAM hierarchical modulation. The analyzing unit 905 exchanges the last two bits of the EL and the first two bits of the BL of the retransmitted data and sequences the retransmitted data from C5C6C3C4C1C2 to C1C2C3C4C5C6. The analyzing unit 905 finds all the constellation points with the last two bits of 01 on the first constellation as the specific constellation points and there are four specific constellation points in each quadrant, translates the coordinate system and makes the coordinate origin at the center of the sixteen specific constellation points of the four quadrants, shown as the dashed coordinate system in FIG. 14D, wherein the underlined constellation points are the specific constellation points with the last two bits of 01. If the position of the mapping point m on the translated coordinate system is closest to a specific constellation point, that specific constellation point is regarded as the transmitted data and in this example, the constellation point closest to the mapping point m is 001001. The users at the cell center may obtain C1C2C3C4 by analyzing the first constellation map according to C5C6 in the retransmitted data. The users at the cell border may obtain C1C2 by analyzing the first constellation map according to C5C6 in the retransmitted data. The analyzing unit 905 checks the sequenced retransmitted data, i.e. checks C1C2 and C3C4C5C6. The analyzing unit 905 may adopt the CRC method and returns a check report to the transmitting apparatus through the communication unit 901. If the check is wrong, the report indicating that the BL and/or EL check is wrong can be returned. In this example, the received data obtained by demodulation are the same with the transmitted data so the check result indicates correct, and after the transmitting apparatus receives the check report, the data transmission ends.

The analyzing unit 905 may further perform the following steps. The C1C2* are demodulated during the first transmission and the C5C6* are demodulated during the retransmission. If LLR(C1C2*)≧LLR(C5C6*), it is believed that the reliability that C1C2* during the first transmission are correct is higher than the reliability that C5C6* during the retransmission are correct. The analyzing unit 905 finds all the constellation points with the last two bits of 00 on the second constellation map as the specific constellation points and there are four specific constellation points in each quadrant, translates the coordinate system and makes the coordinate origin at the center of the sixteen specific constellation points of the four quadrants, shown as the dashed coordinate system in FIG. 14C, wherein the underlined constellation points are the specific constellation points with the last two bits of 00. If the position of the mapping point m of the retransmitted data on the translated coordinate system is closest to a specific constellation point, that specific constellation point is regarded as the transmitted data and in this example, the constellation point closest to the mapping point m is 011000. The users at the cell center may obtain C3C4C5C6 by analyzing the second constellation map according to C1C2* in the first transmission. The users at the cell border may obtain C1C2 according to the above maximum likelihood estimation. The analyzing unit 905 sequences the retransmitted data from C5C6C3C4C1C2 into C1C2C3C4C5C6, checks the sequenced retransmitted data, i.e. checks C1C2 and C3C4C5C6. The analyzing unit 905 may adopt the CRC method and returns a check report to the transmitting apparatus through the communication unit 901. If the check is wrong, the report indicating that the BL and/or EL check is wrong can be returned. In this example, the received data obtained by demodulation are the same with the transmitted data so the check result indicates correct, and after the transmitting apparatus receives the check report, the data transmission ends.

If LLR(C1C2*)<LLR(C5C6*), it is believed that the reliability that C1C2* during the first transmission are correct is lower than the reliability that C5C6* during the retransmission are correct. In this example, since C5C6* are in the BL, it is easy to demodulate C5C6* as 01 in the QPSK+64QAM hierarchical modulation. The analyzing unit 905 exchanges the last two bits of the EL and the first two bits of the BL of the retransmitted data and sequence the retransmitted data from C5C6C3C4C1C2 to C1C2C3C4C5C6. The analyzing unit 905 finds all the constellation points with the last two bits of 01 on the first constellation as the specific constellation points and there are four specific constellation points in each quadrant, translates the coordinate system and makes the coordinate origin at the center of the sixteen specific constellation points of the four quadrants, shown as the dashed coordinate system in FIG. 14D, wherein the underlined constellation points are the specific constellation points with the last two bits of 01. If the position of the mapping point m on the translated coordinate system is closest to a specific constellation point, that specific constellation point is regarded as the transmitted data and in this example, the constellation point closest to the mapping point m is 001001. The users at the cell center may obtain C1C2C3C4 by analyzing the first constellation map according to C5C6* in the retransmitted data. The users at the cell border may obtain C1C2 by analyzing the first constellation map according to C5C6* in the retransmitted data. The analyzing unit 905 checks the sequenced retransmitted data, i.e. checks C1C2 and C3C4C5C6. The analyzing unit 905 may adopt the CRC method and returns a check report to the transmitting apparatus through the communication unit 901. If the check is wrong, the report indicating that the BL and/or EL check is wrong can be returned. In this example, the received data obtained by demodulation are the same with the transmitted data so the check result indicates correct, and after the transmitting apparatus receives the check report, the data transmission ends.

If the transmitting apparatus transmits the retransmitted data through the retransmitting unit 705 and the receiving apparatus only has BL data error, at this time, the determining unit 904 determines information in the control signaling of the retransmitted data and obtains that the data order of this retransmission is C5C6C3C4C1C2, and then it calls the analyzing unit 905.

The second case: the communication unit 701 of the transmitting apparatus receives the check report returned from the receiver and finds that there is only BL data error, i.e. only C1C2 error, and the retransmission counting unit 703 performs the retransmission counting and determines whether the retransmission times exceed the preset threshold (3 in this example) and if yes, the procedure ends; otherwise the check report is transmitted to the determining unit 704. The determining unit 704 determines that there is only BL data error according to the check report and calls the BL retransmitting unit 706, which modulates the data in the order of C1C2C3C4C5C6 with the second constellation map and transmits the data through the communication unit 701.

The communication units 901 of the receiving apparatuses of users at the cell center and at the cell border receive the data at the same time, determine whether to process or abandon the data according to their returned check reports and if the returned check report indicates that the receiving apparatus has received the data correctly, the retransmitted data are abandoned. If the returned check report indicates that there is only BL data error, the retransmission times determining unit 903 determines whether the retransmission times exceed the preset threshold (3 in this example) according to information in the received data and if yes, the procedure ends; otherwise, the received data are transmitted to the determining unit 904. The determining unit 904 obtains from the retransmitted data that the data order is C1C2C3C4C5C6 and modulates the received data with the second constellation map and calls the BL analyzing unit 906. The BL analyzing unit 906 demodulates the data with the second constellation map and obtains the mapping point. As shown in FIG. 14E, the distance between the mapping point and the correct constellation point is a. Since the distance between the mapping point and the coordinate axis becomes larger, it is easy to demodulate C1C2 as 00 in the QPSK+64QAM hierarchical modulation. The BL analyzing unit 906 checks the analyzed data with the CRC method, i.e. checks C1C2 of the BL and C3C4C5C6 of the EL and returns a check report to the transmitting apparatus through the communication unit 901. If the check is wrong, the report indicating that the BL and/or EL check is wrong can be returned. In this example, the check result of the demodulated retransmitted data indicates correct, and after the transmitting apparatus receives the check report, the data transmission ends.

The third case: the communication unit 701 of the transmitting apparatus receives the check report returned from the receiver and finds that there is only EL data error, i.e. only C3C4C5C6 error, and the retransmission counting unit 703 performs the retransmission counting and determines whether the retransmission times exceed the preset threshold (3 in this example) and if yes, the procedure ends; otherwise the check report is transmitted to the determining unit 704. The determining unit 704 determines that there is only EL data error according to the check report and calls the EL retransmitting unit 707, which exchanges the last two bits of the data and the first two bits of the BL, modulates the data in the order of C5C6C3C4C1C2 with the first constellation map and transmits the data through the communication unit 701.

The communication units 901 of the receiving apparatuses of users at the cell center and at the cell border receive the data at the same time, determine whether to process or abandon the data according to their returned check reports and if the returned check report indicates that the receiving apparatus has received the data correctly, the retransmitted data are abandoned. If the returned check report indicates that there is only EL data error, the retransmission times determining unit 903 determines whether the retransmission times exceed the preset threshold (3 in this example) according to information in the received data and if yes, the procedure ends; otherwise, the received data are transmitted to the determining unit 904. The determining unit 904 obtains from the retransmitted data that the data order is C5C6C3C4C1C2 and modulates the received data with the first constellation map and calls the EL analyzing unit 907. The EL analyzing unit 907 demodulates the data with the first constellation map and obtains the mapping point. As shown in FIG. 14E, the distance between the mapping point and the correct constellation point is a. Since C5C6 are in the BL, it is easy to demodulate C5C6 as 01 in the QPSK+64QAM hierarchical modulation. The EL analyzing unit 907 sequences the retransmitted data from C5C6C3C4C1C2 to C1C2C3C4C5C6, and then it checks the sequenced retransmitted data. The EL analyzing unit 907 may adopt the CRC method to check C1C2 and C3C4C5C6 and returns a check report to the transmitting apparatus through the communication unit 901. If the check is wrong, the report indicating that the BL and/or EL check is wrong can be returned. In this example, the received data obtained by demodulation are the same with the transmitted data so the check result indicates correct, and after the transmitting apparatus receives the check report, the data transmission ends.

As a preferred embodiment, for QPSK+64QAM hierarchical modulation, if there is only EL error after the transmitter receives the check report for the first time, the EL retransmitting unit 706 exchanges the last two bits of the EL and the first two bits of the BL, modulates the data with the first constellation map in the order of C5C6C3C4C1C2 and then the retransmits the data to the receiving apparatus. If there is still only EL error in the check report returned for the second time, the EL retransmitting unit 706 exchanges the first two bits of the EL and the first two bits of the BL, i.e. in the order of C3C4C1C2C5C6, modulates the data with the first constellation map and then retransmits the data to the receiving apparatus.

If the EL analyzing unit 906 returns the check reports for the first time and second time both indicating there is only EL data error, when the transmitter retransmits data again, the EL analyzing unit 906 obtains the data order according to the data retransmitted from the transmitting apparatus, demodulates the retransmitted data with the first constellation map, exchanges the first two bits of the EL and the first two bits of the BL and sequences the data to constitute the BL and EL of the received data, i.e. sequences the retransmitted data from C3C4C1C2C5C6 into C1C2C3C4C5C6 and then the sequenced retransmitted data is checked and a check report is returned to the transmitting apparatus.

Figure 15:
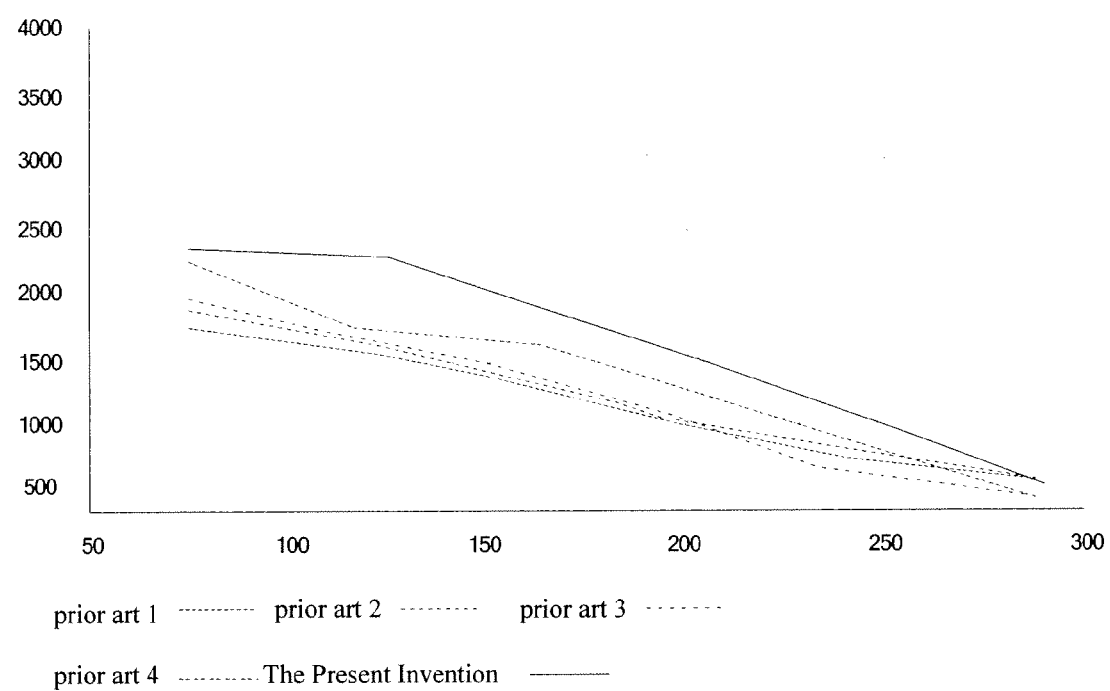
FIG. 15 is a schematic diagram showing a comparison between user data throughputs according to on embodiment of the present invention and that according to prior arts.

FIG. 15 is a schematic diagram showing a comparison between user data throughputs according to one embodiment of the present invention and that according to the prior art, wherein the y-axis represents the data throughput (Kbps) and the x-axis represents the distance(m) between the user and the base station. For the users at the cell center, the data throughput increases 14% according to the method and apparatus of the present invention and for the users at the cell border, the data throughput increases 23% according to the method and apparatus of the present invention.

The beneficial effects of the present invention are that: the last two bits of the EL and the first two bits of the BL are exchanged during the retransmission according to the first constellation which has set therein intervened constellation points with the same last two bits and according to the second constellation which has a hierarchical gain over the first constellation, so that a good gain can be obtained through one retransmission; interferences from a lot of unrelated constellation points can be avoided by finding specific constellation points on the constellation which have the same last two bits with the transmitted data, so that the reception can be more accurate; the analysis can be more accurate by finding specific constellation points, translating the coordinate system and obtaining other part of the data according to a part of data; and the retransmission times are reduced, the ratio of demodulating correctly is improved and the user data throughput is enhanced.

The above detailed description provides a further illustration of the objective, technical solution and beneficial effects of the present invention. It is to be noted that the above is only the detailed description of the present invention and is not intended to limit the scope to be protected by the present invention. Without departing from the spirit and principle of the present invention, any modifications, equivalent substitutes and improvements should fall in the protection scope of the present invention.

The invention claimed is:

1. A method of transmitting multimedia broadcast/multicast data based on hierarchical modulation, comprising:
determining whether the data is transmitted for a first time and if yes, modulating the data with a first constellation map in an order from a basic layer to an enhanced layer and then transmitting the data; and
receiving a check report returned from a receiver, determining whether the check report indicates there are both basic layer and enhanced layer data errors and if yes, exchanging last two bits of the enhanced layer and first two bits of the basic layer and modulating the data with a second constellation map and then transmitting the data, and if no, determining whether the check report indicates there is only the basic layer error and if yes, modulating the data with the second constellation map in the order from the basic layer to the enhanced layer and then transmitting the data, otherwise exchanging the last two bits of the enhanced layer and the first two bits of the basic layer and modulating the data with the first constellation map and then transmitting the data; wherein
the method further comprising:
before the step of determining whether the check report indicates there are both basic layer and enhanced layer data errors, a retransmission times counting step of counting the retransmission times of the data and if the retransmission times exceed a preset threshold, the procedure ends; otherwise the procedure proceeds to determining whether the check report indicates there are both basic layer and enhanced layer data errors.

2. The method according to claim 1, wherein intervened constellation points on the first constellation map and second constellation map have a same last two bits and the constellation points with the same last two bits are distributed evenly on the first constellation map and second constellation map; the constellation points on the first constellation map and second constellation map have different hierarchical gains.

3. The method according to claim 2, wherein the constellation points on the first constellation map and second constellation map having different hierarchical gains comprises: translating constellation points in a first quadrant of the first constellation map to a third quadrant of the second constellation map, translating constellation points in a second quadrant of the first constellation map to a fourth quadrant of the second constellation map, translating constellation points in a third quadrant of the first constellation map to a first quadrant of the second constellation map, and translating constellation points in a fourth quadrant of the first constellation map to a second quadrant of the second constellation map.

4. The method according to claim 1, wherein for a QPSK+ 64QAM hierarchical modulation, if the check reports received for two times both indicate that there is only the enhanced layer data error, the first two bits of the enhanced layer and the first two bits of the basic layer are exchanged and then the data thus obtained are modulated with the first constellation map and transmitted.

5. An apparatus for transmitting multimedia broadcast/multicast data based on hierarchical modulation, comprising a communication unit, a transmitting unit, a determining unit, a retransmitting unit, an enhanced layer retransmitting unit and a basic layer retransmitting unit, wherein
the transmitting unit is operable to modulate data to be transmitted with a first constellation map in an order from a basic layer to an enhanced layer and transmits the data to the communication unit for further transmission;
the communication unit is operable to receive a check report returned from a receiver and the determining unit is operable to determine according to the check report and if there are both enhanced layer and basic layer data errors, the retransmitting unit is called; if there is only the basic layer data error, the basic layer retransmitting unit is called; and if there is only the enhanced layer data error, the enhanced layer retransmitting unit is called;
the retransmitting unit is operable to exchange the last two bits of the enhanced layer and the first two bits of the basic layer, modulate the data with a second constellation map and then transmitting the data to the communication unit for further retransmission;
the enhanced layer retransmitting unit is operable to exchange the last two bits of the enhanced layer and the first two bits of the basic layer, modulate the data with the first constellation map and then transmit the data to the communication unit for further retransmission; and
the basic layer retransmitting unit is operable to modulate the data with the second constellation map in the order from the basic layer to the enhanced layer and then transmits the data to the communication unit for further retransmission; wherein
the apparatus further comprising:
a retransmission times counting unit connected between the determining unit and the communication unit and for counting the retransmission times and if the retransmission times exceeds a threshold, the data transmission is stopped.

6. The apparatus according to claim 5, wherein intervened constellation points on the first constellation map and second constellation map have a same last two bits and the constellation points with the same last two bits are distributed evenly on the first constellation map and second constellation map; the constellation points on the first constellation map and second constellation map have different hierarchical gains.

7. The apparatus according to claim 6, wherein the constellation points on the first constellation map and second constellation map having different hierarchical gains comprises:

translating constellation points in a first quadrant of the first constellation map to a third quadrant of the second constellation map, translating constellation points in a second quadrant of the first constellation map to a fourth quadrant of the second constellation map, translating constellation points in a third quadrant of the first constellation map to a first quadrant of the second constellation map, and translating constellation points in a fourth quadrant of the first constellation map to a second quadrant of the second constellation map.

8. The apparatus according to claim 5, wherein for a QPSK+64QAM hierarchical modulation, if the check reports received by the enhanced layer retransmitting unit for two times both indicate that there is only the enhanced layer data error, the first two bits of the enhanced layer and the first two bits of the basic layer are exchanged and then the data thus obtained are modulated with the first constellation map and transmitted.

9. A method of receiving multimedia broadcast/multicast data based on hierarchical modulation, comprising:
  receiving data and determining whether the data is transmitted for a first time and if yes, demodulating the data with a first constellation map, checking the data in an order from a basic layer to an enhanced layer and then transmitting a check report; and
  receiving retransmitted data from a transmitter, determining whether the check report indicates there are both basic layer and enhanced layer data errors and if yes, demodulating the retransmitted data with a second constellation map, exchanging the last two bits of the enhanced layer and the first two bits of the basic layer of the retransmitted data and sequencing the retransmitted data, checking the sequenced retransmitted data and transmitting a check report; and if not, determining whether the check report indicates there is only the basic layer error and if yes, demodulating the retransmitted data with the second constellation map, checking in the order of the retransmitted data and then transmitting a check report, otherwise demodulating the retransmitted data with the first constellation map, exchanging the last two bits of the enhanced layer and the first two bits of the basic layer and sequencing the retransmitted data, checking the sequenced retransmitted data and transmitting a check report; wherein
  the method further comprising:
  before the step of determining whether the check report indicates there are both basic layer and enhanced layer data errors, a retransmission times determining step for determining whether the retransmission times exceed a preset threshold and if yes, the procedure ends; otherwise the procedure proceeds to the step of determining whether the check report indicates there are both basic layer and enhanced layer data errors.

10. The method according to claim 9, further comprising, before the retransmission times determining step, a step of determining whether a receiver has received the data correctly, and if yes, the receiving of the retransmitted data ends; otherwise the procedure proceeds to the retransmission times determining step.

11. The method according to claim 9, wherein when the check report indicates there are both basic layer and enhanced layer data errors, the method further comprises an analyzing step before the checking step, and in the analyzing operation, specific constellation points on the first constellation map whose last two bits are the same with the last two bits of the sequenced retransmitted data are found, a coordinate system of the first constellation map is translated to a center of the specific constellation points, the sequenced retransmitted data are mapped to the translated coordinate system, distances between the mapping point and the specific constellation points are computed and a specific constellation point closest to the mapping point is found as the sequenced retransmitted data.

12. The method according to claim 9, wherein when the check report indicates there are both basic layer and enhanced layer data errors, before exchanging the last two bits of the enhanced layer and the first two bits of the basic layer of the retransmitted data, the method further comprises: demodulating the first two bits A of the basic layer during a first transmission and demodulating the first two bits B of the basic layer during a retransmission and if a maximum likelihood of $A \geqq$ a maximum likelihood of B, finding specific constellation points on the second constellation map whose last two bits are the same with A, translating the coordinate system of the second constellation map to a center of the specific constellation points, mapping the retransmitted data to the translated coordinate system and then computing distances between the mapping point and the specific constellation points and finding a specific constellation point closest to the mapping point as the retransmitted data; if the maximum likelihood of A<the maximum likelihood of B, after the sequence step in which the last two bits of the EL and the first two bits of the BL of the retransmitted data are exchanged, finding specific constellation points on the first constellation map whose last two bits are the same with the last two bits of the sequenced retransmitted data, translating the coordinate system of the first constellation map to a center of the specific constellation points, mapping the sequenced retransmitted data to the translated coordinate system and then computing distances between the mapping point and the specific constellation points and finding a specific constellation point closest to the mapping point as the sequenced retransmitted data.

13. The method according to claim 9, wherein after the step of determining whether the check report indicates there are both basic layer and enhanced layer data errors, the method further comprises: determining a data order in a control signaling of the retransmitted data and if the data order is from the basic layer to the enhanced layer, demodulating the retransmitted data with the second constellation map, checking in the order of the retransmitted data and transmitting a check report; otherwise demodulating the retransmitted data with the second constellation map, exchanging the last two bits of the enhanced layer and the first two bits of the basic layer of the retransmitted data and sequencing the retransmitted data, checking the sequenced retransmitted data and transmitting a check report.

14. The method according to any one of claims 9, and 10-13, wherein intervened constellation points on the first constellation map and second constellation map have a same last two bits and the constellation points with the same last two bits are distributed evenly on the first constellation map and second constellation map; the constellation points on the first constellation map and second constellation map have different hierarchical gains.

15. The method according to claim 14, wherein the constellation points on the first constellation map and second constellation map having different hierarchical gains comprises: translating constellation points in a first quadrant of the first constellation map to a third quadrant of the second constellation map, translating constellation points in a second quadrant of the first constellation map to a fourth quadrant of the second constellation map, translating constellation points in a third quadrant of the first constellation map to a first quadrant of the second constellation map, and translating constellation points in a fourth quadrant of the first constellation map to a second quadrant of the second constellation map.

16. The method according to claim 9, wherein for a QPSK+64QAM hierarchical modulation, if the check reports transmitted for two times both indicate that there is only the enhanced layer data error, when the retransmitted data are received again, the retransmitted data are demodulated with the first constellation map, the first two bits of the enhanced layer and the first two bits of the basic layer are exchanged and the retransmitted data are sequenced, and then the sequenced retransmitted data are checked and a check report is transmitted.

17. An apparatus for receiving multimedia broadcast/multicast data based on hierarchical modulation, comprising a communication unit, a receiving unit, a determining unit, an analyzing unit, an enhanced layer analyzing unit and a basic layer analyzing unit, wherein the receiving unit is operable to obtain through the communication unit the data transmitted from a transmitter, demodulates the received data with a first constellation map, checks in an order from a basic layer to an enhanced layer and transmits a check report;

the communication unit is operable to receive retransmitted data from the transmitter and the determining unit is operable to determine according to the check report and if there are both enhanced layer and basic layer data errors, the analyzing unit is called; if there is only the basic layer data error, the basic layer analyzing unit is called; and if there is only the enhanced layer data error, the enhanced layer analyzing unit is called;

the analyzing unit is operable to demodulate the data with a second constellation map, exchange the last two bits of the enhanced layer and the first two bits of the basic layer and sequence the retransmitted data, checks the sequenced retransmitted data and transmits a check report to the communication unit for further transmission;

the enhanced layer analyzing unit is operable to demodulate the retransmitted data with the first constellation map, exchange the last two bits of the enhanced layer and the first two bits of the basic layer of the retransmitted data and sequence the retransmitted data, check the sequenced retransmitted data and transmit the sequenced retransmitted data to the communication unit for further transmission; and the basic layer analyzing unit is operable to demodulate the retransmitted data with the second constellation map, check the retransmitted data and transmits the retransmitted data to the communication unit for further retransmission; wherein the apparatus further comprising:

a retransmission times determining unit connected between the determining unit and the communication unit and for determining whether the retransmission times exceed a threshold and if yes the receiving of the data is stopped.

18. The apparatus according to claim 17, wherein the communication unit determines whether the apparatus has received the data correctly and if yes, the receiving of the retransmitted data ends; otherwise the retransmitted data are transmitted to the retransmission times determining unit.

19. The apparatus according to claim 17, wherein when the check report indicates there are both basic layer and enhanced layer data errors and before checking, the analyzing unit finds specific constellation points on the first constellation map whose last two bits are the same with the last two bits of the sequenced retransmitted data, translates a coordinate system of the first constellation map to a center of the specific constellation points, maps the sequenced retransmitted data to the translated coordinate system, computes distances between a mapping point and the specific constellation points and finds a specific constellation point closest to the mapping point as the sequenced retransmitted data.

20. The apparatus according to claim 17, wherein before the analyzing unit exchanges the last two bits of the enhanced layer and the first two bits of the basic layer of the retransmitted data, the apparatus further demodulates the first two bits A of the basic layer during a first transmission and demodulates the first two bits B of the basic layer during a retransmission and if a maximum likelihood of A$\geq$a maximum likelihood of B, finds specific constellation points on the second constellation whose last two bits are the same with A, translates the coordinate system of the second constellation map to a center of the specific constellation points, maps the retransmitted data to the translated coordinate system and then computes distances between the mapping point and the specific constellation points and finds a specific constellation point closest to the mapping point as the retransmitted data; if the maximum likelihood of A<the maximum likelihood of B, after the last two bits of the EL and the first two bits of the BL of the retransmitted data are exchanged, finds specific constellation points on the first constellation map whose last two bits are the same with the last two bits of the sequenced retransmitted data, translates the coordinate system of the first constellation to a center of the specific constellation points, maps the sequenced retransmitted data to the translated coordinate system and then computes distances between the mapping point and the specific constellation points and finds a specific constellation point closest to the mapping point as the sequenced retransmitted data.

21. The apparatus according to claim 17, wherein the determining unit further comprises determines a data order in a control signaling of the retransmitted data and if the data order is from the basic layer to the enhanced layer, the basic layer analyzing unit is called; otherwise the analyzing unit is called.

22. The apparatus according to any one of claims 17, and 18-21, wherein intervened constellation points on the first constellation map and second constellation map have a same last two bits and the constellation points with the same last two bits are distributed evenly on the first constellation map and second constellation map; the constellation points on the first constellation map and second constellation map have different hierarchical gains.

23. The apparatus according to claim 22, wherein the constellation points on the first constellation map and second constellation map having different hierarchical gains comprises: translating constellation points in a first quadrant of the first constellation map to a third quadrant of the second constellation map, translating constellation points in a second quadrant of the first constellation map to a fourth quadrant of the second constellation map, translating constellation points in a third quadrant of the first constellation map to a first quadrant of the second constellation map, and translating constellation points in a fourth quadrant of the first constellation map to a second quadrant of the second constellation map.

24. The apparatus according to claim 17, wherein for a QPSK+64QAM hierarchical demodulation, if the check reports returned from the enhanced layer analyzing unit for two times both indicate that there is only the enhanced layer data error, when receiving the retransmitted data again, the enhanced layer analyzing unit demodulates the retransmitted data with the first constellation map, exchanges the first two bits of the enhanced layer and the first two bits of the basic layer and sequences the retransmitted data, and then checks the sequenced retransmitted data and transmits a check report.

* * * * *